United States Patent
Skuin et al.

(10) Patent No.: US 10,713,543 B1
(45) Date of Patent: Jul. 14, 2020

(54) ENHANCED TRAINING OF MACHINE LEARNING SYSTEMS BASED ON AUTOMATICALLY GENERATED REALISTIC GAMEPLAY INFORMATION

(71) Applicant: Electronic Arts Inc., Redwood City, CA (US)

(72) Inventors: Boris Skuin, Redwood City, CA (US); Caedmon Somers, Redwood City, CA (US)

(73) Assignee: Electronic Arts Inc., Redwood City, CA (US)

( * ) Notice: Subject to any disclaimer, the term of this patent is extended or adjusted under 35 U.S.C. 154(b) by 183 days.

(21) Appl. No.: 16/007,818

(22) Filed: Jun. 13, 2018

(51) Int. Cl.
| | |
|---|---|
| *A63F 13/55* | (2014.01) |
| *G06K 9/66* | (2006.01) |
| *G06N 20/00* | (2019.01) |
| *G06K 9/00* | (2006.01) |
| *G06K 9/62* | (2006.01) |
| *G06T 13/40* | (2011.01) |

(52) U.S. Cl.
CPC ............... *G06K 9/66* (2013.01); *A63F 13/55* (2014.09); *G06K 9/00724* (2013.01); *G06K 9/00744* (2013.01); *G06K 9/6262* (2013.01); *G06N 20/00* (2019.01); *G06T 13/40* (2013.01)

(58) Field of Classification Search
CPC ................. G06K 9/00744; G06K 9/00724
See application file for complete search history.

(56) References Cited

U.S. PATENT DOCUMENTS

| | | |
|---|---|---|
| 5,274,801 A | 12/1993 | Gordon |
| 5,683,082 A | 11/1997 | Takemoto et al. |
| 6,253,193 B1 | 6/2001 | Ginter et al. |
| 8,100,770 B2 | 1/2012 | Yamazaki et al. |
| 8,142,282 B2 | 3/2012 | Canessa et al. |

(Continued)

OTHER PUBLICATIONS

Maria-Virginia Aponte, Guillaume Levieux, Stephane Natkin, "Measuring the level of difficulty in single player video games", 2011, Elsevier, Entertainment Computing.

(Continued)

*Primary Examiner* — Robert T Clarke, Jr.
(74) *Attorney, Agent, or Firm* — Knobbe, Martens, Olson & Bear, LLP

(57) ABSTRACT

Systems and methods for enhanced training of machine learning systems based on automatically generated visually realistic gameplay. An example method includes obtaining electronic game data that includes rendered images and associated annotation information, the annotation information identifying features included in the rendered images to be learned, and the electronic game data being generated by a video game associated with a particular sport. Machine learning models are trained based on the obtained electronic game data, with training including causing the machine learning models to output annotation information based on associated input of a rendered image. Real-world gameplay data is obtained, with the real-world gameplay data being images of real-world gameplay of the particular sport. The obtained real-world gameplay data is analyzed based on the trained machine learning models. Analyzing includes extracting features from the real-world gameplay data using the machine learning models.

17 Claims, 10 Drawing Sheets

(56) References Cited

U.S. PATENT DOCUMENTS

| | | |
|---|---|---|
| 8,267,764 B1 | 9/2012 | Aoki et al. |
| 8,398,476 B1 | 3/2013 | Sidhu et al. |
| 8,540,560 B2 | 9/2013 | Crowley et al. |
| 8,907,193 B2 | 12/2014 | Cross et al. |
| 8,914,251 B2 | 12/2014 | Ohta |
| 9,616,329 B2 | 4/2017 | Szufnara et al. |
| 9,919,217 B2 | 3/2018 | Aghdaie et al. |
| 10,478,730 B1* | 11/2019 | Burnett ............ A63F 13/20 |
| 2004/0067788 A1* | 4/2004 | Angelopoulos ...... A63F 13/10 463/1 |
| 2005/0130725 A1* | 6/2005 | Creamer ............ A63F 13/10 463/1 |
| 2007/0066403 A1 | 3/2007 | Conkwright |
| 2008/0268961 A1 | 10/2008 | Brook |
| 2011/0295649 A1 | 12/2011 | Fine et al. |
| 2012/0083330 A1 | 4/2012 | Ocko |
| 2012/0115580 A1 | 5/2012 | Hornik et al. |
| 2012/0220376 A1 | 8/2012 | Takayama et al. |
| 2012/0233105 A1* | 9/2012 | Cavallaro ............ G01S 5/16 706/46 |
| 2012/0244941 A1 | 9/2012 | Ostergren et al. |
| 2012/0276964 A1* | 11/2012 | Jones ............ A63F 13/12 463/3 |
| 2013/0316779 A1 | 11/2013 | Vogel |
| 2014/0235346 A1* | 8/2014 | Kim ............ A63F 13/12 463/31 |
| 2015/0339532 A1* | 11/2015 | Sharma ............ G06K 9/00671 345/633 |
| 2016/0067612 A1 | 3/2016 | Ntoulas et al. |
| 2017/0259177 A1 | 9/2017 | Aghdaie et al. |
| 2018/0161682 A1* | 6/2018 | Myhill ............ H04N 21/25891 |
| 2018/0169526 A1 | 6/2018 | Aghdaie et al. |
| 2018/0243656 A1* | 8/2018 | Aghdaie ............ A63F 13/67 |
| 2019/0354759 A1* | 11/2019 | Somers ............ G06K 9/6256 |

OTHER PUBLICATIONS

Jamey Pittman, "The Pac-Man Dossier", Gamasutra, downloaded on Jun. 1, 2018, available at «https://web.archive.org/web/20161107115846/https://www.gamasutra.com/view/feature/3938/the_pacman_dossier.php?print=1»».

Chris Pruett, Defining the All-Important Difficulty Curve, The Journal of Education, Community, and Value, vol. 8, Issue 1, Jan.-Feb. 2008, http ://com mons.pacificu. edu/cg i/viewcontent.cg i?article=1002&context=inter08.

* cited by examiner

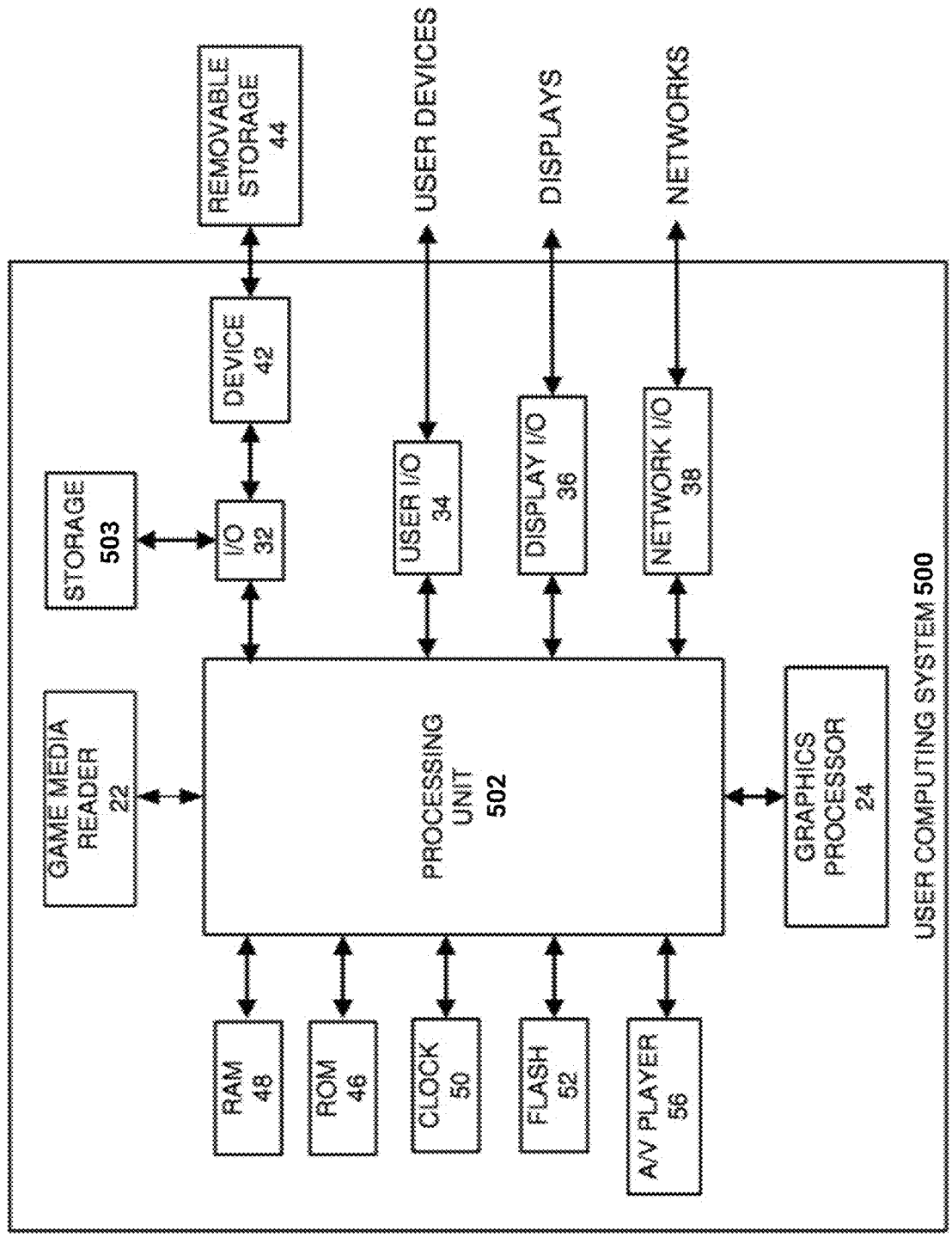

US 10,713,543 B1

ENHANCED TRAINING OF MACHINE LEARNING SYSTEMS BASED ON AUTOMATICALLY GENERATED REALISTIC GAMEPLAY INFORMATION

FIELD OF THE DISCLOSURE

The described technology generally relates to computer technology and, more specifically, to machine learning.

BACKGROUND

Modern video games commonly emphasize realism through graphically impressive representations of characters, environments, scenarios, and so on. While an example video game may be set in a fantastical environment, and include fictional characters, the example video game may still include lifelike renditions of the fantastical environment and characters. To create such environments and characters, video game modelers and designers may spend substantial time creating wire-frames, meshes, textures, and so on. Additionally, a three-dimensional model of a character may be animated according to specific scenarios or stories presented within the electronic game. To animate the three-dimensional model, video game designers and modelers may have to ensure proper and realistic movement of the underlying skeletal model.

Another example video game may be a sports game, for example hockey, baseball, basketball, football, curling, and so on. In such a video game, the characters may be designed to accurately represent their real-world counterparts. For example, a hockey game may include accurate representations of all real-world professional hockey players. These video game hockey characters may be designed, through substantial effort, to move and act in realistic ways. As an example, motion capture may be utilized to inform movement of the video game hockey characters. Additionally, substantial time and resources may be spent ensuring that the video game hockey characters utilize authentic real-world strategies to play the hockey game. Indeed, determining how real-world players move around a hockey rink, pass to other players, take shots, and so on, may require a substantial time investment. Translating this information into the video game may similarly require complex implementation of rules that enable simulation of artificial intelligence. As users of the video game learn these rules, the artificial intelligence may seem less impressive. Thus, video game designers may constantly be required to tweak and update these rules.

SUMMARY OF THE DISCLOSURE

Described herein are systems and methods for machine learning techniques utilized to improve the functioning of video games. As will be described, electronic gameplay from video games (e.g., sports video games) may be utilized to train machine learning models. Example electronic gameplay may include images generated by a video game along with label or annotation information describing features to be learned. A system implementing the trained machine learning models may obtain images of real-world gameplay, and may identify or extract the learned features from the real-world gameplay. As an example, the machine learning models may be trained to identify aspects of a video game hockey player, such as arms, legs, hockey stick, skates, and so on. In this example, the system may obtain images of a real-world hockey game, and may similarly identify a real-world hockey player's arms, legs, hockey stick, skates, and so on. As will be described, this identified information may be utilized to improve animation or motion of video game hockey players. Thus, due to the techniques described herein, machine learning models trained via video game data may be able to properly label, classify, and/or annotate real-world images.

Obtaining sufficient training data to effectively train machine learning models can present monumental technical challenges. To address this issue, publicly accessible databases were created with images of different objects along with labels for the objects. While these publicly accessible databases may be utilized to broadly train machine learning models, these databases generally do not include sufficient images to enable highly accurate models. In general, such publicly accessible databases are utilized to test machine learning models for accuracy. Additionally, these databases include broad spectrums of objects, but lack the enormous number of samples required for specificity in a particular area. With respect to the above example of a hockey game, these databases are ill equipped to train machine learning models to learn player specifics, player habits or maneuvers, ice hockey rink specifics, information regarding how television cameras are operated (e.g., camera angles or tracking of players or action), and so on.

In addition to publicly accessible databases, another example scheme to obtain training data may include obtaining images or video of real-world sports and utilizing the obtained images or video to train machine learning models. For example, users may obtain broadcast video of hockey games, and utilize the broadcast video to train machine learning to learn specifics of hockey games. In this example scheme, the obtained broadcast video will require labels or annotations for features being learned. Since these labels or annotations will be manually assigned by users—as automatically assigning the labels would require an already learned model—this scheme can present a massive, and inefficient, burden on the users.

Thus, the techniques described herein can utilize the high fidelity and realism afforded by video games to automatically generate training data. As will be described, video games may be augmented to automatically generate label or annotation information. For example, the video game engine may be adjusted to output specific information associated with rendered video game images. With respect to the above-described example of learning how hockey players move their hockey sticks, video game images of hockey players moving their sticks may be generated along with information describing the particulars of the hockey stick (e.g., which pixels correspond to the hockey stick, positional or directional information, and so on). Therefore, machine learning models may be trained to recognize disparate features from video games. Real-world images of hockey games may then be ingested, and useful information from the real-world images may be extracted via the trained machine learning models. For example, the useful information may include movement of hockey sticks. Since this information is being extracted from real-world professional hockey players, the information may be utilized to improve how video game hockey players use their sticks (e.g., how the video game players use sticks to pass, shoot goals, guard, and so on). As will be described, the real-world images may be automatically adjusted prior to ingestion to ensure that they adhere closely to the video game images utilized to train the machine learning models.

As will be described below, the trained machine learning models can be utilized to extract useful features associated with real-world gameplay. For example, a system described herein can utilize trained machine learning models to extract realistic animation and movement information of real-world players. As another example, the system can learn how real-world cameras are operated to capture a real-world sports game. For instance, the system can learn how human camera operators track real-world gameplay action. This extracted and learned information may then be utilized or imported into video games. Thus, the training machine learning models can dramatically simplify various aspects of video games including artificial intelligence of characters, realistic animation and movement of characters, vantage points and viewpoints of electronic gameplay which are to be shown to users, and so on.

Optionally, learned information may be automatically imported into video games to improve the functioning of the video games. For example, user experience can be improved, technical ability or accuracy can be improved, and so on. As an example, animation of a particular real-world hockey player may be extracted from footage of a hockey game. Example animation can include animation illustrating a game winning shot or celebratory dance performed after the game winning shot. Via the techniques described herein, the extracted animation may be provided to users of a hockey video game the following day. For example, the animation may be downloadable content. The extracted animation may describe skeletal movement of the real-world hockey player, and this skeletal movement may be applied to a video game version of the real-world hockey player. In this way, the real-world hockey player's movement may be translated onto the video game version of the player.

The systems and methods described herein therefore improve the functioning of the computer and address technological problems. Prior example systems have generally relied on manual generation of training data, for example manual labeling of specific features to be learned. Additionally, some example systems may create training data by adjusting existing training data. As an example, these systems may shift locations of features to be learned within images via one or more pixels. In this way, a set of training data may be expanded. However, the above-described example systems are limited in the training data available to them without large undertakings by users to manually label or create new training data. As will be described in more detail, video game data, or other realistic animation or computer graphics information, may be utilized as training data. With respect to video game data, when a video game generates images for presentation on a display, the video game may already have information describing all features present within the generated images. Thus, this information may be opportunistically utilized as labels or annotations for specific features being learned.

Accordingly, in various embodiments, large amounts of data are automatically and dynamically calculated interactively in response to user inputs, and the calculated data can be efficiently and compactly presented to a user by the system. Thus, in some embodiments, the user interfaces described herein are more efficient as compared to previous user interfaces in which data is not dynamically updated and compactly and efficiently presented to the user in response to interactive inputs.

Further, as described herein, the system may be configured and/or designed to generate user interface data useable for rendering the various interactive user interfaces described. The user interface data may be used by the system, and/or another computer system, device, and/or software program (for example, a browser program), to render the interactive user interfaces. The interactive user interfaces may be displayed on, for example, electronic displays (including, for example, touch-enabled displays).

Various aspects of the novel systems, apparatuses, and methods are described more fully hereinafter with reference to the accompanying drawings. Aspects of this disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the novel systems, apparatuses, and methods disclosed herein, whether implemented independently of or combined with any other aspect. For example, an apparatus may be implemented or a method may be practiced using any number of the aspects set forth herein. In addition, the scope is intended to encompass such an apparatus or method which is practiced using other structure, functionality, or structure and functionality in addition to or other than the various aspects set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to any systems and/or devices that could benefit from universal facial expression. The detailed description and drawings are merely illustrative of the disclosure rather than limiting, the scope of the disclosure being defined by the appended claims and equivalents thereof.

In various embodiments, systems and/or computer systems are disclosed that comprise computer readable storage media having program instructions embodied therewith, and one or more processors configured to execute the program instructions to cause the one or more processors to perform operations comprising one or more aspects of the above- and/or below-described embodiments (including one or more aspects of the appended claims).

In various embodiments, computer-implemented methods are disclosed in which, by one or more processors executing program instructions, one or more aspects of the above- and/or below-described embodiments (including one or more aspects of the appended claims) are implemented and/or performed.

In various embodiments, computer program products comprising computer readable storage media are disclosed, wherein the computer readable storage media have program instructions embodied therewith, the program instructions executable by one or more processors to cause the one or more processors to perform operations comprising one or more aspects of the above- and/or below-described embodiments (including one or more aspects of the appended claims).

BRIEF DESCRIPTION OF THE DRAWINGS

The following drawings and the associated description herein are provided to illustrate specific embodiments of the disclosure and are not intended to be limiting.

FIG. 5 illustrates an embodiment of a hardware configuration for a computing system.

DETAILED DESCRIPTION

Figure 1:
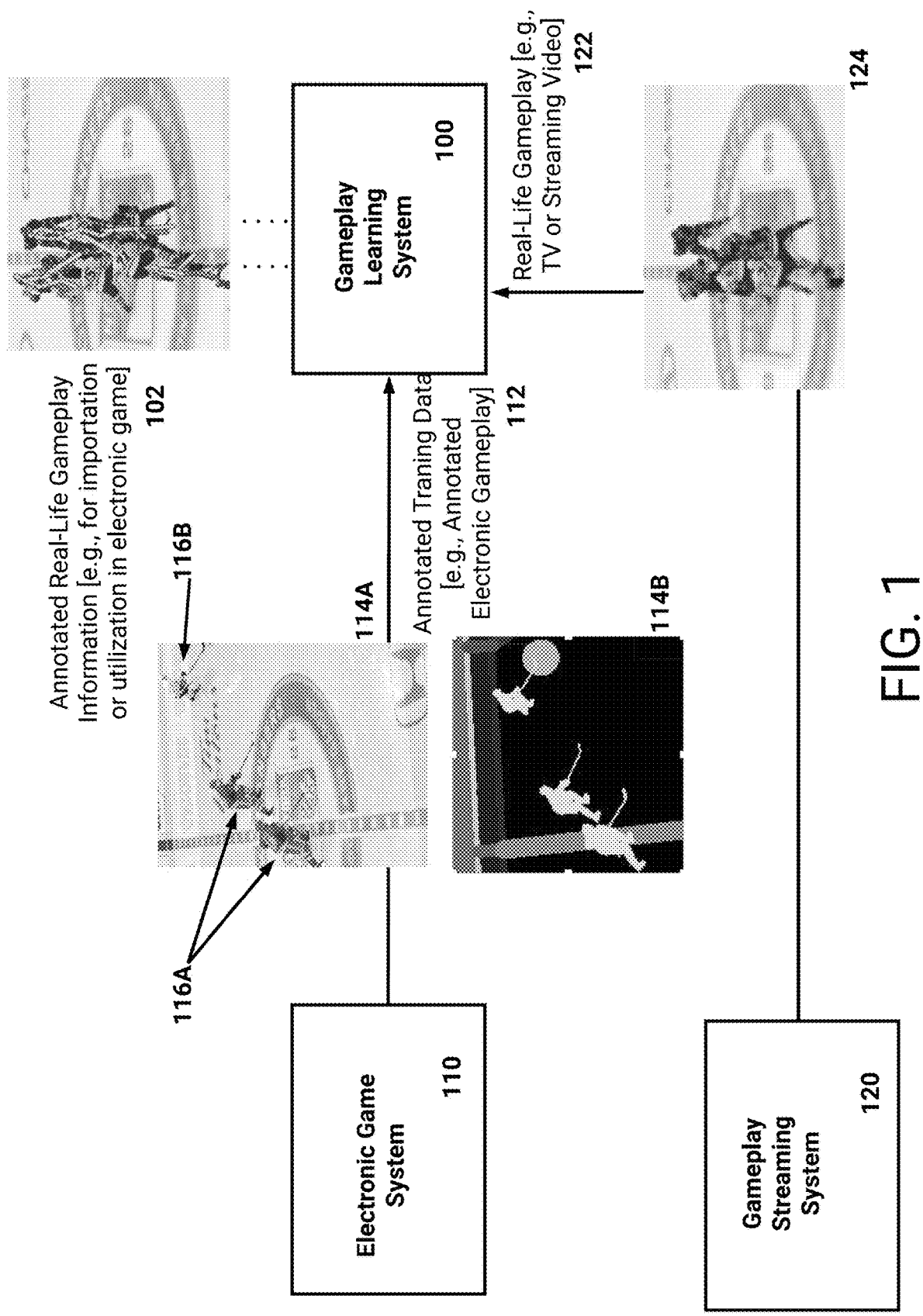
FIG. 1 illustrates a block diagram of an example gameplay learning system in communication with other systems.

This specification describes schemes for improved generation of training data using video game systems or other computer graphic-based systems. Additionally, this specification describes utilizing the training data to train machine learning models which are able to analyze real-world images or video. For example, a sports video game may be utilized to generate training data, and a system implementing trained machine learning models may analyze real-world images or video of a same sport. While this specification describes utilization of a hockey video game, it should be understood that hockey is merely an illustrative example of a sport. Video games for different sports may instead be utilized and the techniques described herein will enable real-world images or video of these different sports to be similarly analyzed. Additionally, techniques described herein may be applied to video games or other computer graphic-based systems that are not related to sports. For example, realistic role playing games set in a city may be utilized to analyze real-world footage of a city.

Due to advances in computer graphics, images of gameplay generated by example modern video games may advantageously form the basis of training data usable to train one or more machine learning models. As will be described, the machine learning models may learn different aspects or features of the gameplay. For example, a machine learning model may learn to identify differing video game characters, and their locations in a video game environment, as illustrated in images generated by a video game. In the example of a sports video game, the machine learning model may learn to recognize different characters, or types of characters (e.g., goalie, forward, and so on), along with the character's locations in a sports stadium (e.g., ice hockey rink). As another example, specific portions of the video game characters may be learned (e.g., arms, legs, and so on). These portions may represent an underlying skeletal model of the video game character. As another example, a machine learning model may learn to identify features of different video game environments. For example, the features may include elements of a sports stadium. As will be described, these features may be recognized in images of real-world sports stadiums and may be utilized, at least, to determine locations within the sports stadiums of real-world players.

To efficiently generate the images of video game gameplay, a script, or other software, may automatically control a video game such that images of differing types of gameplay may be generated. For example, a script may cause a hockey video game to be automatically played, such that images of the gameplay may be obtained. As another example, particular video games may enable modes of automatic gameplay. For instance, with respect to a sports game a mode may enable two teams to play a match against each other with each team being automatically controlled. Images of the video game gameplay may be extracted from the video game periodically, for example every frame, every half a second, and so on. Additionally, images of the video game gameplay may be extracted according to one or more triggers. Example triggers may include a particular video game character being present, a particular action being performed, and so on. In this way, multitudes of video game images may be automatically generated for utilization in training machine learning models.

Training data, such as the above-described video game images, generally requires labels or annotations of specific features included in the training data. Machine learning models may utilize these labels or annotations to learn to identify the features. For example, images generated by a hockey video game may illustrate features such as, players, ice, elements associated with the ice (e.g., markings on the ice, such as faceoff spots), hockey nets, crowds, scoreboards, and so on. Advantageously, when rendering images of gameplay, video games will have information describing the features included in the rendered images. (e.g., state information, reference information, parameter information, and so on). For example, when rendering an image of a hockey stadium, a hockey video game will have information indicating the players being included in the image, specific portions of each player, locations of a crowd, scoreboard, and so on. The hockey video game may thus provide label or annotation information as being associated with a rendered video game image. Optionally, video games may include custom code or software that causes the video games to generate the label or annotation information.

As will be described in more detail below, label or annotation information for a video game image may include a textual description of a feature included in the video game image, or may include an annotation image generated based on the video game image. A textual description may include an identification of a type of video game character. For example, with respect to hockey a type of video game character may include a goalie, a referee, or a forward or defensive player. In this way, machine learning models may be trained to identify these distinct types of players. An annotation image may be an image associated with the video game image that clearly illustrates specific features of the video game image. For example, an annotation image may include each hockey player as being a particular color (e.g., white), while the remaining portions of the annotation image are different colors. In this way, the annotation image can clearly illustrate locations of the hockey players. As another example, a label image may include portions of a hockey player being distinct colors. For example, a hockey player's stick may be a first color (e.g., red), while the player's arms, legs, head, skates, and so on, are different colors. In this way, the annotation image can clearly illustrate the portions of a hockey player that are to be learned by the machine learning models.

Based on the above-described training data (e.g., video game images and label or annotation information), machine learning models may be trained by a system described herein (e.g., the gameplay learning system 100). Example machine learning models may include neural networks (e.g., convolutional neural networks, recurrent neural networks, and so on), support vector machines, and so on. Optionally, multiple machine learning models may be trained, with each machine learning model being utilized to extract respective features (e.g., a subset of total features being learned). Additionally, one or more machine learning models may utilize information extracted via other machine learning models. For example, a first machine learning model may be trained to identify a particular player. Once identified, a second machine learning model may be trained to identify portions of the particular player (e.g., hockey stick, arms, legs, and so on).

Subsequent to training, the system can obtain real-world images or video, for example images or video of sports being played, and extract information based on the machine learning models. For example, the system can obtain an image of a real-world hockey game, and extract pose information associated with each player included in the image. Pose information may include information indicating portions of a player, such as a location of the players hockey stick, arms, legs, helmet, skates, and so on. As will be described, this pose information may be related to a skeletal model comprising bones and joints which is utilized in video games. The system can track this player across multiple images to identify movement of the player. This pose information may be utilized to improve how video game characters move about a hockey rink. As another example, the system can determine three-dimensional locations of each player in the real-world environment. For example, the system can tag each player's two-dimensional location as illustrated in a real-world image. The system can then determine camera information associated with the real-world image, such as a perspective of a camera that captured the image (e.g., a location of a television camera). Based on this camera information, and information associated with the hockey rink, the system can determine a three-dimensional location on the hockey rink for reach player. This location information can inform how players realistically move about a hockey rink. Additionally, via analyzing images or video of a real-world game, the system can identify how cameras capturing the images or video track the real-world game. In this way, artificial intelligence for in-game cameras that track action of a video-game may be improved or made to appear more realistic.

In order to facilitate an understanding of the systems and methods discussed herein, a number of terms are described below. The terms described below, as well as other terms used herein, should be construed broadly to include the provided definitions, the ordinary and customary meaning of the terms, and/or any other implied meaning for the respective terms.

As used herein, a video game is an electronic game that executes on a user device, such as a dedicated console system (e.g., XBOX®, PLAYSTATION®), a laptop or desktop computer, a tablet, smart phone, and so on. Example video games may include sports games (for example, football games, hockey games, basketball games, racing games, and the like), and so on. The electronic game may be utilized to generate (e.g., render) images or video that are to be used as training data. Additionally, the electronic game may utilize state information to generate label or annotation information associated with the training data. State information may include player information, information associated with objects rendered in a video game image, camera information, score information, and so on. The electronic game may include custom code or software that causes generation of the label or annotation information. As another example, the electronic game may provide state information, or a portion thereof, to an outside system to generate label or annotation information.

As used herein, training data includes information usable to train machine learning systems or models. Training data may include images or video, optionally along with label or annotation information describing features of included in the images or video.

As used herein, label or annotation information (hereinafter referred to as annotation information) may include information usable by a machine learning model to identify a particular feature of an image. For example, annotation information may include a classification for each pixel of an image included in the training data. An example classification may include whether the pixel corresponds to part of a player, to a feature of a video game environment, and so on. Annotation information may further include a designation or textual description of a particular feature. For example, the training data can include images of different players of a hockey game. Each player may be associated with a designation indicating a role or type of the player.

As used herein, machine learning models include supervised or unsupervised machine learning techniques. Example machine learning models can include neural networks (e.g., convolutional neural networks or recurrent neural networks), or other deep learning techniques. The neural networks, for example recurrent neural networks, may utilize long short-term memory (LSTM) and/or gated recurrent units as storage. In this way, frames of video can be utilized by the neural networks and time-series information may be learned.

As used herein in reference to user interactions with data displayed by a computing system, "user input" is a broad term that refers to any type of input provided by a user that is intended to be received and/or stored by a system, to cause an update to data that is displayed by the system, and/or to cause an update to the way that data is displayed by the system. Non-limiting examples of such user input include keyboard inputs, mouse inputs, digital pen inputs, voice inputs, finger touch inputs (e.g., via touch sensitive display), gesture inputs (e.g., hand movements, finger movements, arm movements, movements of any other appendage, and/or body movements), and/or the like. Additionally, user inputs to the system may include inputs via tools and/or other objects manipulated by the user. For example, the user may move an object, such as a tool, stylus, or wand, to provide inputs. Further, user inputs may include motion, position, rotation, angle, alignment, orientation, configuration (e.g., fist, hand flat, one finger extended, etc.), and/or the like. For example, user inputs may comprise a position, orientation, and/or motion of a hand and/or a 3D mouse.

As used herein, a data store can refer to any computer readable storage medium and/or device (or collection of data storage mediums and/or devices). Examples of data stores include, but are not limited to, optical disks (e.g., CD-ROM, DVD-ROM, etc.), magnetic disks (e.g., hard disks, floppy disks, etc.), memory circuits (e.g., solid state drives, random-access memory (RAM), etc.), and/or the like. Another example of a data store is a hosted storage environment that includes a collection of physical data storage devices that may be remotely accessible and may be rapidly provisioned as needed (commonly referred to as "cloud" storage).

As used herein, a database can refer to any data structure (and/or combinations of multiple data structures) for storing and/or organizing data, including, but not limited to, relational databases (e.g., Oracle databases, mySQL databases, and so on), non-relational databases (e.g., NoSQL databases, and so on), in-memory databases, spreadsheets, as comma separated values (CSV) files, eXtendible markup language (XML) files, TeXT (TXT) files, flat files, spreadsheet files, and/or any other widely used or proprietary format for data storage. Databases are typically stored in one or more data stores. Accordingly, each database referred to herein (e.g., in the description herein and/or the figures of the present application) is to be understood as being stored in one or more data stores.

FIG. 1 illustrates a block diagram of a gameplay learning system 100 in communication with other systems. As illustrated, the other systems include an electronic game system 110 and a gameplay streaming system 120. The gameplay learning system 100 may be a system of one or more computers, one or more virtual machines executing on a system of one or more computers, and so on. The electronic game system 110 may, as described above, be a dedicated game console or other user device. Optionally, the gameplay learning system 100 may implement the electronic game system 110. For example, the gameplay learning system 100 may emulate the electronic game system 110. The gameplay streaming system 120 may be a system that receives television broadcasts, such as broadcasts from a sports network, and/or may receive streaming broadcasts over a network (e.g., the internet).

As described above, the gameplay learning system 100 can train machine learning models using annotated training data 112. For example, the annotated training data 112 can include images generated by the electronic game system 100 along with annotation information associated with features to be learned. To generate the annotated training data 112, the electronic game system 110 can execute (e.g., run) a particular video game, such as a sports video game, and store images of rendered gameplay. While the electronic game system 110 is singly illustrated in FIG. 1, it should be understood that multitudes of electronic game systems 110 may be utilized to generate training data 112. Optionally, the electronic game system 110 may be a system of one or more computers, and may execute a multitude (e.g., emulate) a multitude of instances of the same video game. For example, the electronic game system 110 may form, or otherwise be associated with, cloud computing components. In this example, the system 110 may execute each instance of a video game in a respective virtual machine assigned particular components. Example computing components may include a particular amount of memory, processing power (e.g., one or more virtual central processing units), and so on.

The electronic game system 110 can periodically store rendered images of gameplay. As an example, the electronic game system 110 can store images after a threshold quantity of time (e.g., after every 0.0167 seconds, 0.0333 seconds, 0.5 seconds, and so on). These images may therefore represent a cross-section of video game gameplay. Optionally, when rendering video game gameplay, the electronic game system 110 can ensure that user interface elements are not rendered. For example, the system 110 can remove menus or other video game specific user interface elements that may normally be presented to an end-user. In this way, the rendered images can adhere closely to images obtained from real-world gameplay.

The electronic game system 110 may execute software, such as a script (e.g., a Python script), that instructs the electronic game system 110 to store rendered images. The script may periodically (e.g., based on time as described above) instruct (e.g., trigger) the electronic game system 110 to store one or more frames rendered by the system 110. As the video game renders gameplay for presentation, the software may therefore periodically cause storing of rendered images. For example, the system 110 may execute the software in a separate process than processes associated with the video game. In this example, as the video game generates display data, the software may cause the storing of particular rendered images.

Optionally, the software may be a part of a video game, for example the video game may be placed into a development or debug mode which responds to instructions to store rendered images. As another example, the video game may be customized to include the software. Optionally, the gameplay learning system 100 may execute the software, for example in a separate process than processes associated with the video game, and the software may provide instructions to the video game.

In addition to storing video game images according to time, images may be stored based on satisfaction of particular triggers. For example, the electronic game system 110 may store images while a particular action is being performed. As an example with respect to a hockey video game, the system 110 may store images of hockey players taking shots on a hockey net. As another example, the system 110 may store images of players making particular types of turns, or skating in a particular way. As another example, the system 110 may store images that include both right handed and left handed characters. In this example, the system 110 can ensure that training data 112 includes video game hockey players who hold their sticks in opposite hands. Additionally, the system 110 may cause hockey players to be evenly split between right and left handed, or may cause hockey players to either all be right handed or left handed.

Optionally, the gameplay learning system 100 may generate information indicating annotated training data 112 that it is lacking. For example, the system 100 can determine it has less than a threshold quantity of a type of image, or that accuracy of its machine learning models with respect to this type of image is less than a threshold. The generated information may specify, for example, that the system 100 needs images of hockey players skating vertically up an ice hockey rink while a camera is pointing at a back of the hockey players. These images may be required to fill out the training data 112, such that the machine learning models can effectively learn player animations. The electronic game system 110 can therefore trigger images of video game gameplay based on this generated information.

Optionally, the electronic game system 110 may render particular images that remove additional elements besides user interface features. As an example, the electronic game system 110 may render video game characters, while not rendering remaining elements of a scene. With respect to the example of a hockey video game, the electronic game system 110 may render hockey players while removing remaining elements (e.g., ice, hockey net, crowd, and so on). The rendered hockey players may be placed on a transparent background, or on a background of a uniform color which may be ignored by machine learning models (e.g., a green screen). These rendered images can enable the machine learning models to better learn outlines and features of players. Similarly, a hockey rink may be solely rendered, such that machine learning models may learn features of the hockey rink.

As described above, images of particular video game characters may be rendered and provided as training data 112. For some example machine learning models, such as convolutional neural networks, the models may be scale dependent. That is, scale associated with features to be learned may impact an effectiveness of a trained model. Thus, when providing the images of particular video game characters, the system 110 or 100 may adjust a scale of the particular video game characters. However, to learn detail of these video game characters it may be beneficial for the machine learning models to have access to high resolution and/or large versions of the characters. Thus, the training data 112 may include the particular video game characters rendered at different scales. Additionally, the different scales may be beneficial as real-world gameplay (e.g., a broadcast of a hockey game) may include images captured by television cameras at different zoom levels. Thus, the real-world hockey players may appear differently sized within the images. Additionally, the real-world gameplay images may include differently sized hockey players based on their position on a skating rink. Players closer to the camera will appear larger than players farther from the camera. While these variations in player size may be captured in video game images, for example due to differing locations of the video game characters, the training data 112 may still benefit from the explicit addition of differently scaled (e.g., sized) video game characters. Thus, the system 110 or 100 may obtain an image of a particular video game character, and may generate different sizes of the video game character. This adjustment of scale can therefore serve to increase an effectiveness of machine learning models.

The electronic game system 110, or the gameplay learning system 100, may adjust one or more characteristics of the rendered video game gameplay images. The adjustments may serve to make the video game images appear closer to real-world counterparts (e.g., when similarly adjusted). As an example, the adjustments may remove details that can confuse machine learning models, or that are otherwise not necessary for the machine learning models to learn. For example, the resolution of the images may be reduced. As another example, one or more computer vision processing techniques may be applied to the images. Example computer vision processing techniques may include applying an edge detection scheme (e.g., a Canny edge detector) to better highlight distinctions between gameplay elements (e.g., distinction between characters and background elements). Another example technique may include applying blur to the image. As will be described, images of real-world gameplay 122 may be similarly blurred to reduce a distinction between video game images and real-world gameplay 122 images. Other example computer vision processing techniques may include adjusting rendered lighting of rendered images. For example, and with respect to the example of a hockey video game, lights may be rendered as reflecting off of an ice hockey rink. These lights may be adjusted to make them appear more diffuse.

As illustrated, the annotated training data 112 includes an example rendered gameplay image 114A generated by the electronic game system 110. The image 114A is of three hockey players traversing an ice hockey rink. Additionally, two of the hockey players 116A are on a same team, while a third hockey player 116B is on a different team. Thus, the image 114A may be utilized to learn included features such as outlines of players, particular team outfits, features of the ice hockey rink (e.g., center line, faceoff spot), and so on.

In addition the rendered gameplay image 114A, annotation information 114B is illustrated as being provided to the gameplay learning system 100. In the example of FIG. 1, the annotation information 114B is an annotation image generated from the gameplay image 114A. This annotation information 114B may cause a particular machine learning model (e.g., a particular neural network) to identify outlines of specific features. For example, different features of the image 114A may be represented in the annotation information 114B as being a distinct color. The colors may optionally be different shades of gray as illustrated. The different features, as illustrated in the example of FIG. 1, can include different video game characters with each video game character assigned a same team optionally being a same color. Optionally, video game characters of different types may be represented as different colors in the annotation information 114B. For example, a goalie may be a first color and other players may be a second color. The different features can further include an indication of the center line, a neutral zone faceoff spot, a wall of the ice hockey rink, the ice of the ice hockey rink, and so on.

While the annotation information 114B in FIG. 1 is illustrated as being outlines of specific features, it should be understood that annotation information may represent identify different features. For example, portions of each hockey player may be distinct colors. In this example, each hockey player's helmet may be a first color, while each hockey player's torso, arms, legs, skates, hockey stick, and so on, may be other colors. Optionally, each hockey player's helmet may be a distinct color than the hockey player's face. In this way, the machine learning models may learn to differentiate between different portions of each character (e.g., the character's helmet and face).

The gameplay learning system 100 can ingest this annotated training data 112 and train one or more machine learning models. As described above, the machine learning models may include neural networks such as convolutional or recurrent neural networks. Optionally, different machine learning models may learn different features included in the annotated training data 112. For example, a first neural network may be trained to identify outlines of specific features. In this way, the first neural network can learn to extract a portion of an image corresponding to a video game character. A second neural network may be trained to identify portions of a video game character, such as their heard, torso, arms, legs, and so on. Optionally, the first neural network may provide information to the second neural network. For example, the first neural network may extract video game characters for the second neural network to then extract or identify respective portions of the video game characters.

Without being constrained by theory, the gameplay learning system 100 may train example neural networks via backpropagation. For example, a neural network may be trained to output the annotation information 114B based on rendered image 114A. Through use of multitudes of rendered images and corresponding annotation information, connections between neurons of the neural network may be adjusted. An example neural network, for example a convolutional neural network, may be formed from distinct layers connected to each other. An example layer may include a convolutional layer comprising locally connected neurons. An additional example layer may include a pooling layer, which may represent non-linear down sampling. An example of non-linear down sampling can include a max pooling layer, which can partition an input image into a set of non-overlapping rectangles and, for each sub-region, output a maximum. Another example layer may include a fully connected layer, for example a layer in which neurons are fully connected. This layer may enable high-level reasoning in the neural network. Furthermore, a loss layer may be included that specifies how training penalizes deviation between predicted information (e.g., based on an input and the output produced by the neural network) and true annotated information (e.g., annotation information 114B).

Another example neural network may include a recurrent neural network. This example neural network may be utilized to extract animation information from subsequent rendered images. For example, rendered images of a particular video game character performing an animation be stored. The recurrent neural network may utilize long short-term memory units as a form of storage or memory. For example, a long short-term memory unit may comprise a cell, an input gate, an output gate, and a forget gate. The cell may be utilized to remember particular values, while the gates may represent a neuron. This example neural network may improve animation detection, and reduce existence of jitter through remembering the sequence of rendered images that form an animation. Additionally, when ingesting real-world gameplay images (e.g., from a broadcast of a real-world sports game), this example neural network may be utilized to better track a specific player.

As illustrated in FIG. 1, the gameplay learning system 100 can obtain real-world gameplay 122 from the gameplay streaming system 120. As described above, the real-world gameplay 122 may be broadcast video obtained via television or streaming services. The gameplay learning system 100 can ingest the real-world gameplay 122, and using trained machine learning models, can extract particular features or information from the real-world gameplay 122.

An example real-world gameplay image 124 is illustrated as being received by the gameplay learning system 100. The gameplay learning system 100 can provide this image 124 to the trained machine learning models, and obtain annotated real-world gameplay information 102. For example, a first machine learning model may extract outlines of real-world players included in the gameplay image 124. Subsequently, a second machine learning model may determine portions of each real-world player. These machine learning models may therefore adjust the received gameplay image 124 to indicate the determined portions of each real-world player. As illustrated, the annotated real-world gameplay information 102 includes each real-world player with lines representing a skeletal model utilized in the video game. The skeletal model may include arms, legs, skates, hockey stick, and so on. The information 102 may therefore represent the pose of each real-world player. This pose information may inform realistic movement of video game characters, and using the gameplay learning system 100, may be automatically extracted from real-world gameplay 122.

Similar to the above description of the rendered image 114A, the gameplay learning system 100 may adjust the real-world gameplay image 124 prior to analysis by the machine learning models. For example, the system 100 can adjust a resolution or scale of the image 124. As another example, the system 100 can apply an edge detection scheme (e.g., a Canny edge detector), and so on. As will be described in more detail below in FIGS. 2A-2F, the system may further extract camera information from the image 124. For example, a real-world location of a camera capturing the image 124 in a sports stadium may be determined. This camera information can be utilized to learn behaviors of camera operators (e.g., how action is tracked). Additionally, the camera information can be utilized to adjust a perspective of the rendered gameplay image 124, such that the perspective represents a virtual camera looking directly onto the ice. As will be described, this perspective may be utilized to better extract each real-world player from the image 124, to learn specific features of real-world ice stadiums (e.g., logos on the walls or ice), and so on. These learned specific features may then cause updating of the machine learning models, thus increasing their accuracy. An example image adjusted to look down on the ice is illustrated in FIG. 2E.

Optionally, and with respect to extracted pose information, the annotated real-world gameplay information 102 may be imported or utilized in the video game. For example, the information 102 is illustrated as including a skeletal model for each real-world player. Similarly, the video game may have video game characters that utilize a skeletal model comprising bones and joints. Since the machine learning models were trained on video game annotated training data 112, the skeletal models represented in the information 102 may be applied to video game characters. For example, a video game character may be adjusted according to a sequence of skeletal models extracted from real-world gameplay 122. In this way, information describing adjustment of a skeletal model may be provided to end-users of the video game (e.g., as downloadable content). The information may represent a particular sequence of movements performed by a real-world player, such as a game winning shot or celebration. Thus, the video game may accurately recreate this sequence of movements in a realistic fashion. Additionally, since this information may be automatically extracted from real-world gameplay 122, end-users can rapidly receive the information for utilization in the video game. In this way, an efficiency of importing notable animations and movements of characters can be increased.

Extracting and Utilizing Camera Parameters

Figure 2A:
FIG. 2A illustrates a block diagram of an example gameplay learning system in communication with an example electronic game system.
Figure 2A:
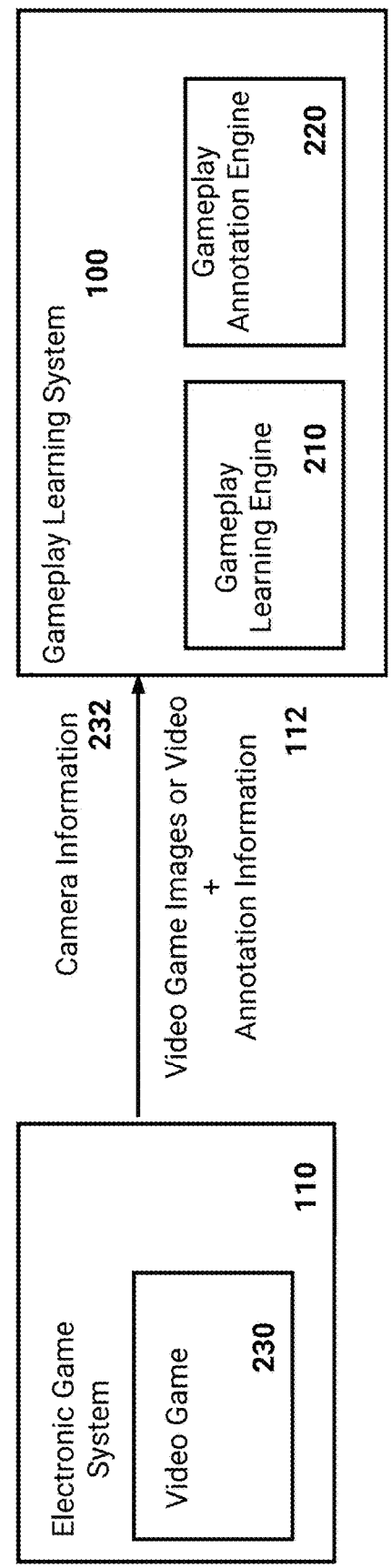

FIG. 2A illustrates a block diagram of an example gameplay learning system 100 in communication with an electronic game system 110. As described above in FIG. 1, the gameplay learning system 100 may receive rendered images of video game gameplay along with annotation information. The gameplay learning system 100 may then utilize the received information to train one or more machine learning models.

The gameplay learning system 100 includes a gameplay learning engine 210 that receives information 112 from a video game 230 executing on the electronic game system 110, and trains machine learning models. As described above, machine learning models may include neural networks, such as convolutional or recurrent neural networks, and the system may update weightings associated with neurons during the training. Additionally, the system may prune or otherwise optimize trained neural networks according to various pruning schemes (e.g., optimal brain damage, greedy criteria-based pruning with fine-tuning by back-propagation, and so on). Additionally, different machine learning models may be trained to extract or identify different features. For example, and as described above, a first neural network may be trained to extract outlines of video game characters. A second neural network may then be trained to identify portions of each video game character, such as by reference to a skeletal model comprising bones and joints.

In addition to training machine learning models to identify particular features, the gameplay learning engine 210 can utilize camera information 232 associated with the video game 230 to transform received two-dimensional rendered images 112 to three-dimensional information. As will be described below, the camera information 232 can enable deeper insights into real-world gameplay. For example, the machine learning models can utilize the camera information to learn three-dimensional positional information associated with each element included in a rendered image. In this way, the machine learning models can be trained to essentially visualize the three-dimensional video game environment. As an example, having access to three-dimensional information can improve detection of video game pose information. As described above, pose information can include an orientation of different portions of a video game character, such as an orientation of a skeletal model comprising bones and joints. When analyzing real-world gameplay images, the gameplay learning system 100 can similarly relate the two-dimensional images to a three-dimensional version of a sports stadium. For example, the gameplay learning system 100 can determine a three-dimensional position of each real-world player with respect to the sports stadium. Thus, each real-world player's movement within the sports stadium can be monitored. This monitoring may be utilized to improve, for example, artificial intelligence of video game characters. The monitoring may also be utilized to improve how cameras in the video game, whose views are rendered and presented to end-users, track movement of players and focus on specific actions of the players. As an example, placement of cameras in a video game sports stadium (e.g., a perspective of the camera), rotation of the cameras, zoom utilized by the cameras, and so on, may all be improved through monitoring of the real-world cameras.

To enable translation between features included in two-dimensional video game images 112 and their corresponding three-dimensional locations, the gameplay learning system 100 can utilize camera information 232 associated with the video game. Camera information 232 can include any information indicative of camera parameters of an in-game camera. Since views from the in-game cameras are presented to end-users, the camera parameters enable translation between the video game images 112 and a three-dimension video game environment. Example camera parameters can include zoom being applied, orientation of the camera within the video game environment (e.g., location of the camera), a rotation being applied, and so on. Based on the camera information 232, and geometrical information associated with the video game environment, the gameplay learning system 100 can determine three-dimensional locations of each feature included in the received video game images 112.

To determine geometrical information, the gameplay learning engine 210 can be trained to identify specific fixed features of the video game environment. With respect to the example of a hockey video game, the engine 210 can be trained to identify fixed features including faceoff spots, faceoff circles, hockey nets, and so on. Since these features will be existent in real-world hockey games, they can similarly be extracted from real-world gameplay images. As illustrated in FIG. 2A, example annotation information 234 is included (e.g., an annotation image). The example annotation information 234 identifies fixed features of a hockey rink as being respective colors. For example, a faceoff circle is indicated as being a first color, and a faceoff spot is indicated as being a second color. Utilizing multitudes of video game images that include these fixed features, and corresponding annotation information, the gameplay learning system 100 can train machine learning models to accurately identify locations of any fixed features included in either video game images or real-world gameplay images.

The specific fixed features can serve as key points of a known environment. For example, and with respect to hockey, the dimensions of a hockey rink can be obtained. Since the system 100 has access to the camera parameters utilized by the video game, the system can determine three-dimensional locations of any point within the hockey rink. That is, the system has access to camera parameters, two-dimensional locations of fixed features within a video game image, and can solve a perspective-n-point problem to determine the corresponding three-dimensional locations. In this way, two-dimensional images (e.g., video game images, real-world gameplay images) may be related to three-dimensional geometric information.

Figure 2B:
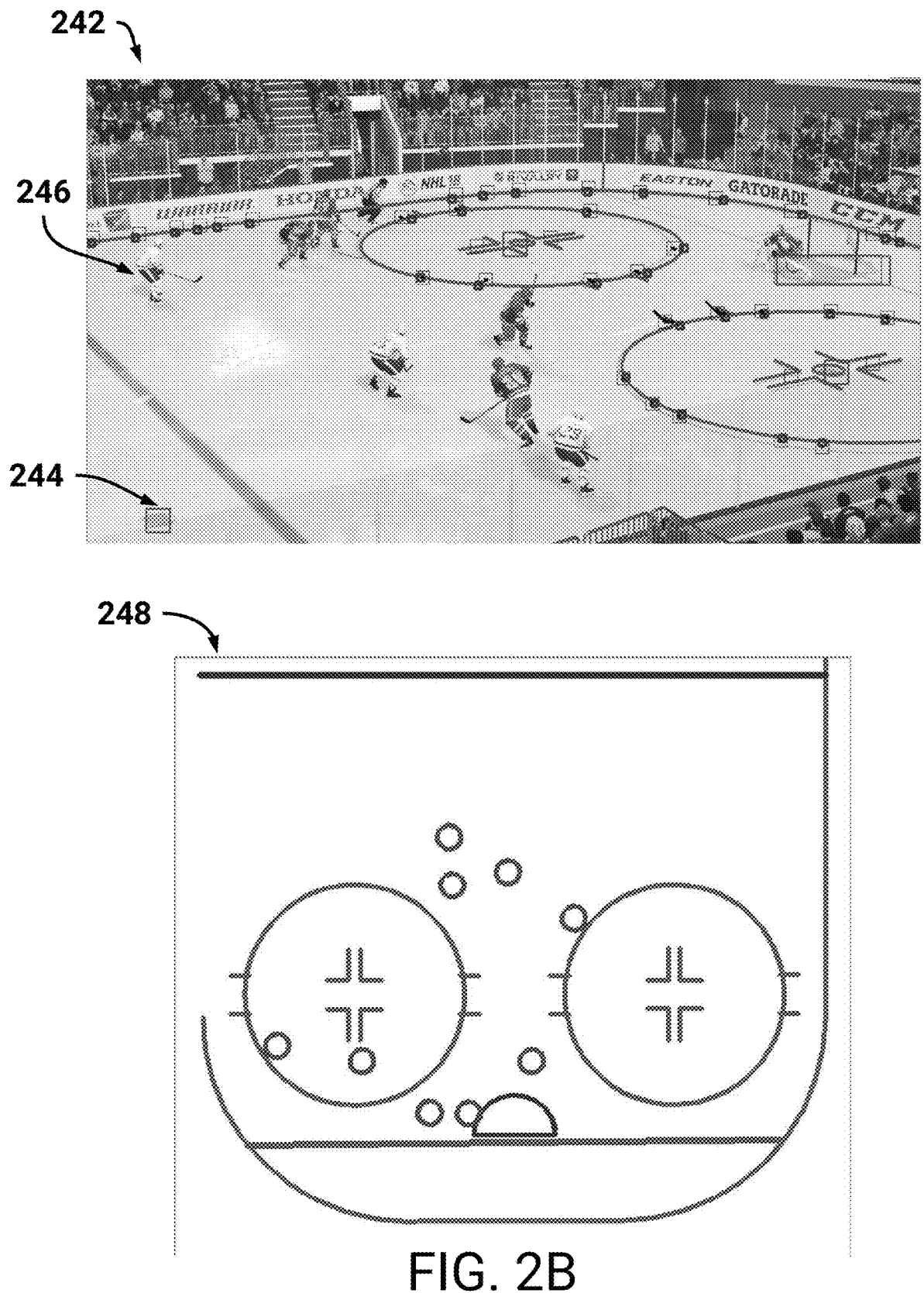
FIG. 2B illustrates an example video game image analyzed via machine learning models.

FIG. 2B illustrates an example video game image 242 analyzed via machine learning models. As described above, the gameplay learning system 100 can train machine learning models to identify particular features. Example features may include fixed-features of a video game environment, such as faceoff circles, faceoff spots, and so on. As illustrated, the gameplay learning system 100 has analyzed video game image 242, and annotated the video game image 242 to identify fixed features (e.g., faceoff spot 244).

Based on these identified fixed features, the gameplay learning system 100 can additionally determine three-dimensional locations of each video game character (e.g., character 246) within a video game environment (e.g., a hockey rink). For example, the system 100 can utilize camera information 232 associated with the video game 230 to determine camera parameters (e.g., orientation, rotation, zoom). Additionally, the system 100 can obtain geometrical information associated with the video game environment. Therefore, the system 100 can determine a perspective associated with an in-game camera that captured the video game image 242. Based on this perspective and the geometrical information, the system 100 can determine each player's orientation with respect to the fixed features (e.g., faceoff spot 244).

Thus, the gameplay learning system 100 can generate an example image 248 associated with the features of image 242. The example image 248 includes a 'top-down' overview of the features included in image 242. For example, the example image 248 indicates a position of each video game character along with a representation of the ice hockey rink proximate to the video game characters. The gameplay learning system 100 may optionally utilize this information to train additional machine learning models. For example, and as will be described in more detail below with respect to FIG. 2C, the gameplay learning system 100 may analyze real-world gameplay images and generate a similar 'top-down' overview. This top-down overview advantageously summarizes the positions of each real-world player in a real-world environment (e.g., a hockey rink). The gameplay learning system 100 can utilize this positional information to identify how real-world players maneuver about the real-world environment. Additionally, the positional information can inform starting positions of players, complex team strategies and arrangements during particular actions, and so on. The information may thus inform improvements to artificial intelligence.

Figure 2C:
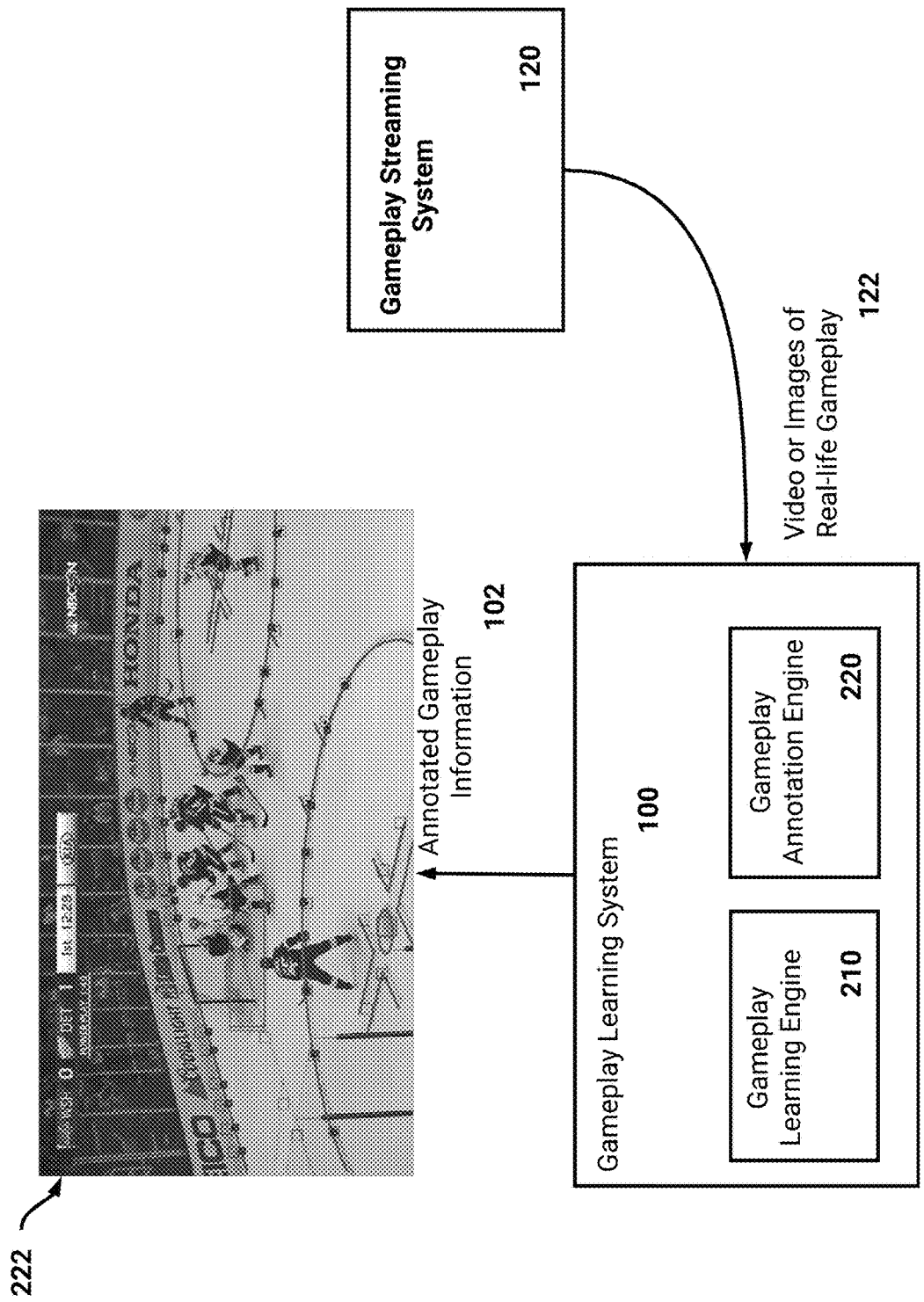
FIG. 2C illustrates a block diagram of an example gameplay learning system in communication with an example gameplay streaming system.

FIG. 2C illustrates a block diagram of an example gameplay learning system 100 in communication with a gameplay streaming system 120. As described above, with respect to FIG. 1, the gameplay learning system 100 can obtain images or video of real-world gameplay and generate annotated gameplay information 102. As described in FIG. 2A, the gameplay learning system 100 can generate annotated gameplay information 102 based on trained machine learning models. As will be described below, the gameplay learning system 100 can analyze received real-world gameplay 122, for example two-dimensional images, and translate the real-world gameplay 122 to three-dimensional environments. In this way, the gameplay learning system 100 can determine three-dimensional locations of each real-world player. Additionally, the system 100 can identify information describing movement of real-world cameras. Optionally, and as will be described, the gameplay learning system 100 can update the trained machine learning models based on the determined three-dimensional information—thus improving accuracy of the machine learning models.

The gameplay learning system 100 includes a gameplay annotation engine 220 that can obtain real-world gameplay images or video 122, and generate annotated gameplay information 102. As illustrated, the gameplay learning system 100 has obtained a real-world gameplay image 222 of a hockey game, and has utilized machine learning models to identify fixed features on the gameplay image 222. As described above, with respect to FIG. 2A, example fixed features can include faceoff spots, faceoff circles, lines on the hockey rink, hockey nets, and so on. As will be described, the machine learning models can be updated based on real-world gameplay images to include unique fixed features of specific hockey rinks. For example, a logo printed on the ice of a specific ice hockey rink may be utilized as a fixed feature. Optionally the logo may be imported into a hockey video game to increase an accuracy of the video game's version of the ice hockey rink.

Based on the identified fixed features of the image 222, the gameplay learning system 100 can relate the fixed features to known key points of an environment. In the example of hockey, the fixed features can be related to key points, such as faceoff spots and/or faceoff circles.

Figure 2D:
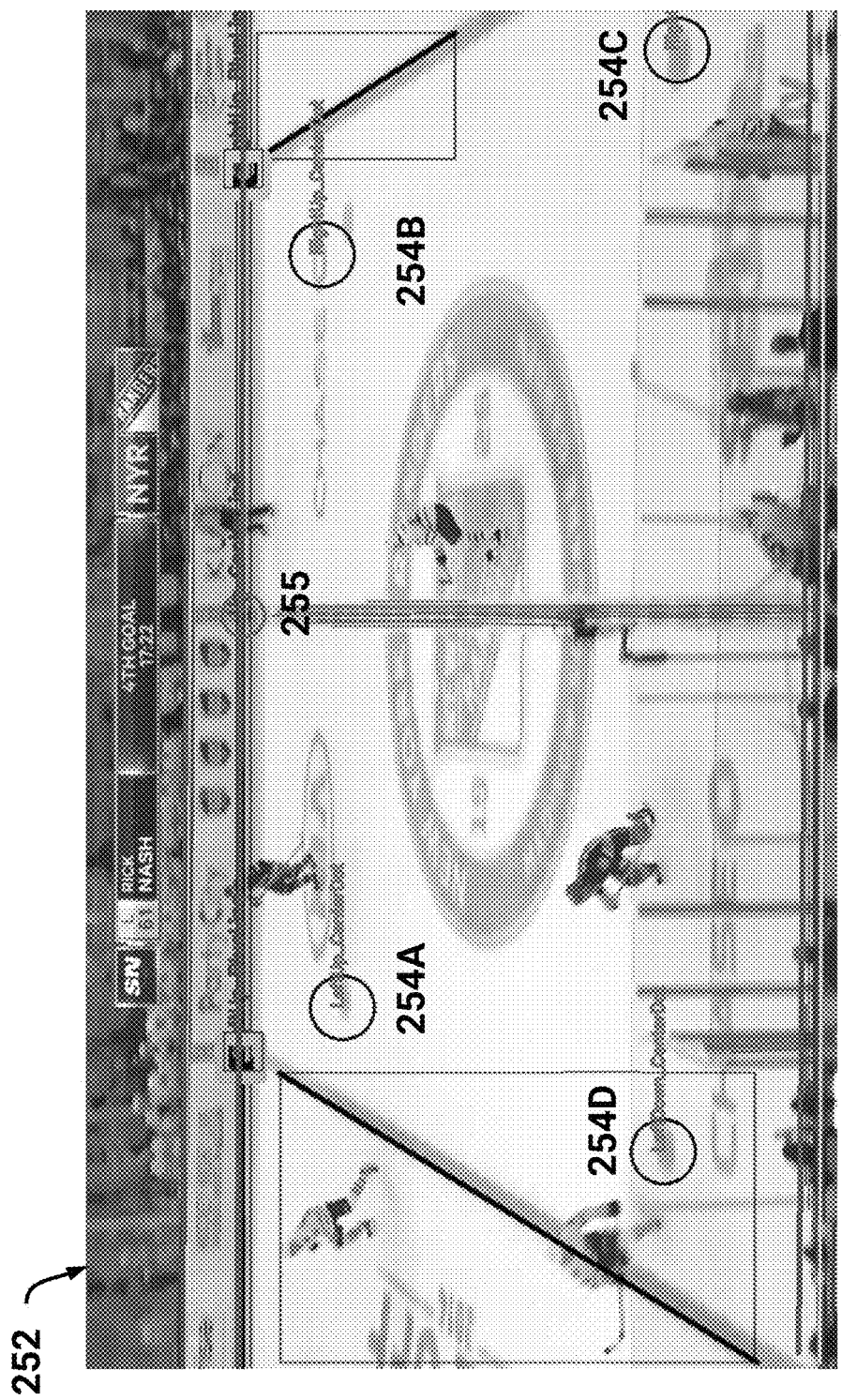
FIG. 2D illustrates an example image with fixed features identified, and with the fixed features related to key points of a hockey stadium.
Figure 2E:
FIG. 2E illustrates a real-world gameplay image adjusted in perspective via an example gameplay learning system.
Figure 2E:
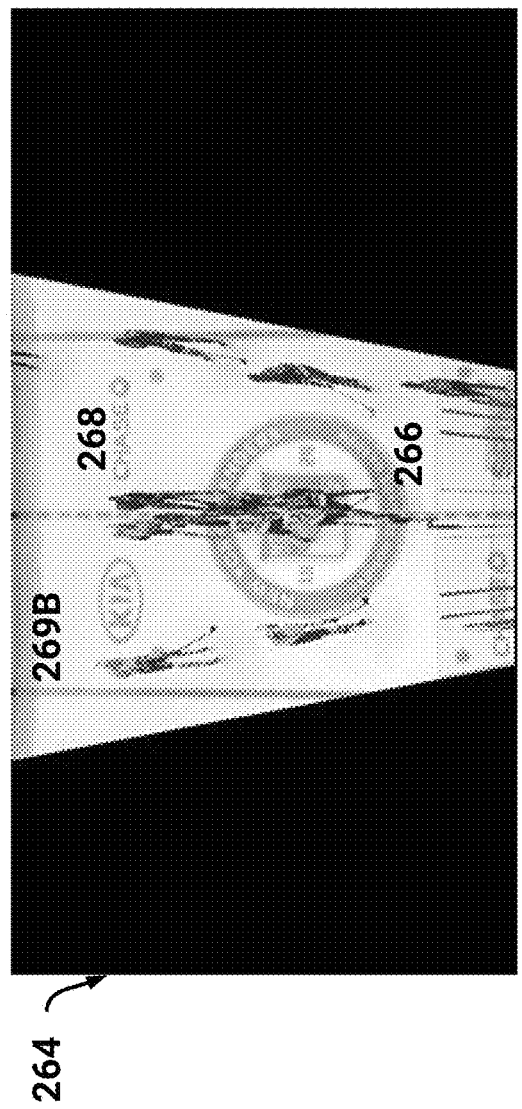

FIG. 2D illustrates an example image 252 with fixed features identified via trained machine learning models, and with the fixed features related to key points of a hockey stadium (e.g., key points 254A-254D, representing faceoff circles). Particular key points may be selected for utilization in translating the two-dimensional example image 252 to three-dimensional information. For example, faceoff circles may be considered more reliable (e.g., these points may be more reliably detected) than faceoff spots. Additionally, center lines may be considered less reliable than the aforementioned faceoff circles and spots. Thus, a ranking of the identified key points may be utilized to select a threshold number of key points that will be relied upon to determine three-dimensional information. In the example of FIG. 2D the faceoff circles 254A-254D may therefore be selected over center line 255 as key points.

Upon selection of the key points, the gameplay learning system 100 can obtain geometrical information associated with the real-world environment. For example with respect to hockey, the gameplay learning system 100 can obtain three-dimensional locations of the faceoff circles 254A-254D in a hockey rink (e.g., the hockey rink may be standardized, or the system 100 can obtain geometric information of a specific hockey rink). Thus, the gameplay learning system 100 can access two dimensional coordinates in an image with corresponding three-dimensional locations.

Optionally, to solve the above-described perspective-n-point problem, the gameplay learning system 100 may utilize location information of a real-world camera that obtained image 252. For example, the gameplay learning system 100 may have information identifying three-dimensional locations of all cameras utilized to broadcast sports games. This information may be obtained from, for example, video game 230 which may have this information defined. In this embodiment, the gameplay learning system 100 can obtain identifications of three-dimensional locations of each real-world camera. The system 100 can then select the camera that provides a best match of three-dimensional projections of the key points as included in the image 252. For example, based on a perspective of the image 252, the system 100 can determine a camera most likely to have captured the image 252. Thus, the gameplay learning system 100 can determine an orientation camera parameter. Therefore, the system 100 can solve for the remaining camera parameters, such as zoom and rotation. For example, and with respect to a perspective-n-point problem, the gameplay learning system 100 may perform matrix multiplication to solve for the unknown zoom and rotation variables.

Optionally, if the gameplay learning system 100 does not have location information of the real-world camera, the system 100 can back calculate camera information based on one or more images of the real-world gameplay. For example, an image of a center ice faceoff perspective may be utilized as a starting point. Based on this perspective, the gameplay learning system 100 can solve for the camera parameters. To ensure proper determination of the camera parameters, the system 100 can optionally identify an image that is not zoomed in (e.g., an image with a greatest coverage of a sports stadium). This image may then be utilized to determine the remaining camera parameters (e.g., location, rotation) based on the identified key points.

FIG. 2D illustrates four key points being utilized (e.g., faceoff spots 254A-254B). For some example images, less key points may be able to be extracted. As an example, real-world players may be blocking faceoff spots, or an image may be zoomed in such that only one or two fixed features are visible. In this case of two identified fixed features, and a known camera location, the gameplay learning system 100 can determine zoom. In the case of one identified fixed feature, and a known camera location, the gameplay learning system 100 can determine rotation. Thus, if one identified fixed feature is included in an image, the gameplay learning system 100 can utilize a zoom camera parameter value from a prior image frame (e.g., the most recent image frame).

Camera distortion may additionally be evident in particular images. For example, a real-world camera may utilize a wide-angle lens which may introduce distortion at the edges of an image. As another example, particular lenses may have natural distortion at the edges (e.g., barrel distortion). In these examples, the gameplay learning system 100 may correct for this distortion at the edges (e.g., based on the Brown-Conrady model). However, optionally the distortion may be retained. Since the distortion may be small, and may be relatively linear such that it will impact everything presented in the image, the relative positions of features included in the image may be relatively preserved (e.g., locations of real-world players).

Based on the above-described information, the gameplay learning system 100 can therefore determine the camera parameters of a camera which captured the image 252. Thus, three-dimensional locations of all points within the image 252 may be determined. As described above, the gameplay learning system 100 can therefore obtain three-dimensional locations of each real-world player and monitor their movement throughout a sports game. Additionally, based on monitoring movement of a camera, the system 100 can store information describing how a real-world camera operator controls the camera. For example, the system 100 may store camera parameters for each obtained image. Since these camera parameters indicate orientation, rotation, and zoom, the system 100 can generate information describing progression of the camera during the game. For example, and with respect to the example of hockey, the system 100 can further identify movement of a hockey puck during a game. Based on correlating the movement of the puck to the progression of the camera, the system 100 can generate information usable to improve realism of camera tracking in the video game 230.

In addition to correlating camera movements to movement of a puck, the system 100 can determine how particular types of action in a real-world environment (e.g., hockey rink) is monitored by a camera. For example, if two real-world players are vying for control of a puck, the camera information may be monitored. As the real-world players converge on an end of the hockey rink, the camera information may be monitored. This camera information may therefore be classified based on what it is depicting. The gameplay learning system 100 may additionally classify camera movements according to a detected style. As an example, the system 100 can classify camera movements according to how abruptly they move, or how close they zoom in on players, and so on. These different detected styles may be utilized to improve the functioning of video game cameras.

Figure 2F:
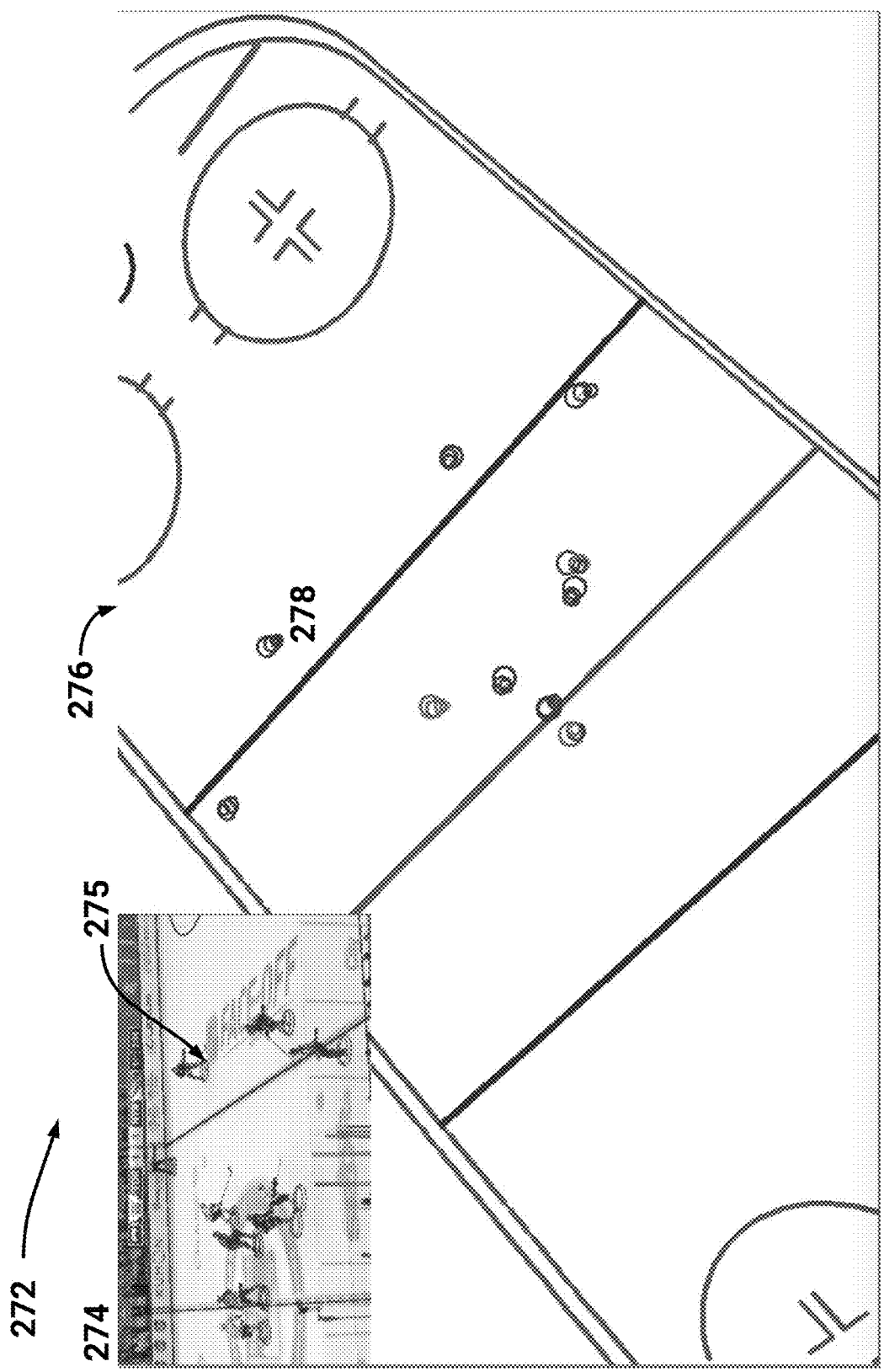
FIG. 2F illustrates three-dimensional positions of players as illustrated in an obtained real-world gameplay image.

FIGS. 2E-2F illustrate example images generated based on determined camera parameters. As described above, with respect to FIGS. 2C-2D, camera parameters may be determined for each real-world gameplay image. These camera parameters can enable three-dimensional information to be determined for the two-dimensional real-world gameplay images.

FIG. 2E illustrates a real-world gameplay image 262 adjusted in perspective via the gameplay learning system 100. As described above, the system 100 can determine camera parameters for image 262, such that three-dimensional information can be extracted. Using the determined three-dimensional information for image 262, the system 100 has generated an example image 264 with an adjusted perspective. As illustrated, the adjusted perspective represents a virtual camera being pointed directly down on the real-world players. This adjusted perspective causes the faceoff circle 266 to become an actual circle in the image 264. Similarly, logos included on the ice (e.g., logo 268) is also circular.

Thus, the gameplay learning system 100 can utilize this image 264 to learn specific fixed features that are unique to an environment. For example, the system 100 can learn ice hockey stadium specific ice surface elements, such as the logo 268 and graphical representation of the faceoff circle 266. This learned information may be utilized to improve an accuracy of a video game. Furthermore, through knowledge of these learned unique fixed features, the machine learning models of the gameplay learning system 100 can distinguish between these features and other features. For example, particular logos may confuse machine learning models as being faceoff spots. Based on the automatically learned fixed features, the gameplay learning system 100 can learn better distinguish between the particular logos and faceoff spots.

As another example, the gameplay learning system 100 can utilize the image 264 to more accurately detect real-world player contours. That is, the real-world players may be more accurately separately from an ice surface. To separate real-world players from an ice surface, the gameplay learning system 100 may subtract the image 264 from an empty-ice surface. For example, the system 100 may obtain images of the ice without players (e.g., prior to a start of the game), and may adjust a perspective of these images as in image 264. In this way, the players may be removed from the ice surface and machine learning models trained to detect outlines of players (e.g., as described above), may more accurately extract these players.

As another example, the gameplay learning system 100 can utilize the image 264 to accurately detect a moving object (e.g., a hockey puck). For example, the gameplay learning system 100 can store a representation of the ice surface in the adjusted perspective. Based on subtracting the ice surface from obtained real-world gameplay images, the system 100 may better identify a moving puck.

As another example, camera parameters may be adjusted to increase their accuracy based on the image 264. The adjusted perspective of the image 264 causes real-world vertical lines to appear vertically in the image 264. For example, vertical line 269A in obtained real-world gameplay image 262 appears as a vertical line 269B in the adjusted image 264. If the gameplay learning system 100 generates the adjusted image 264, and line 269B is not vertical (e.g., within a threshold angle of vertically upwards), the system 100 can adjust the camera parameters until line 269B appears vertical. Since the camera parameters inform the translation between a two-dimensional image and three-dimensional information, such as three-dimensional locations of each player, correct camera parameters can improve usefulness of information generated by the system 100. As described above, distortion in real-world gameplay images may cause features at the edges of an image to be distorted. If a line therefore does not appear vertically, it may also represent distortion. However, this distortion will not appear uniform along the length of the vertical line (e.g., portions closer to the extremities of an image will be more distorted). Therefore, the gameplay learning system 100 can determine whether the distortion is causing a line to not appear vertically in an adjusted image, or whether the camera parameters are incorrect. With respect to distortion, the system 100 can correct the distortion as described above.

FIG. 2F illustrates three-dimensional positions of players as illustrated in an obtained real-world gameplay image 274. As described above, the gameplay learning system 100 can determine three-dimensional positions of each player. For example, the system 100 can analyze a two-dimensional real-world gameplay image 272, and determine locations within a real-world environment on which each player is positioned. As illustrated, real-world gameplay image 272 is illustrated as including indications of each player's position on the ice (e.g., the circles below each player, such as circle 275). As described above, each player's position in a two-dimensional image may be determined via machine learning models trained to extract positional information.

Based on each player's two-dimensional position within the gameplay image 272, the gameplay learning system 100 can translate the position to a three-dimensional position in the hockey rink illustrated in portion 276 of image 272. The gameplay learning system 100 can then include a representation of each player's position (e.g., circle 278 may correspond to circle 275).

Optionally, image 272 may be presented on a user device, and may be respond to user input. Users viewing image 272 may select a particular player's position on either the two-dimensional image 274 or portion 276, and view the corresponding position on either image 274 or portion 276. Additionally, an entire real-world game may be presented. For example, positions of each player may be monitored over the course of a game and presented to a user. In this way, the user can view real-time positional information of each player. As described above, this monitored positional information may be utilized to improve artificial intelligence of a video game. As an example, the artificial intelligence may be made more realistic via actual positions taken by real-world players.

Example Process Flows

Figure 3:
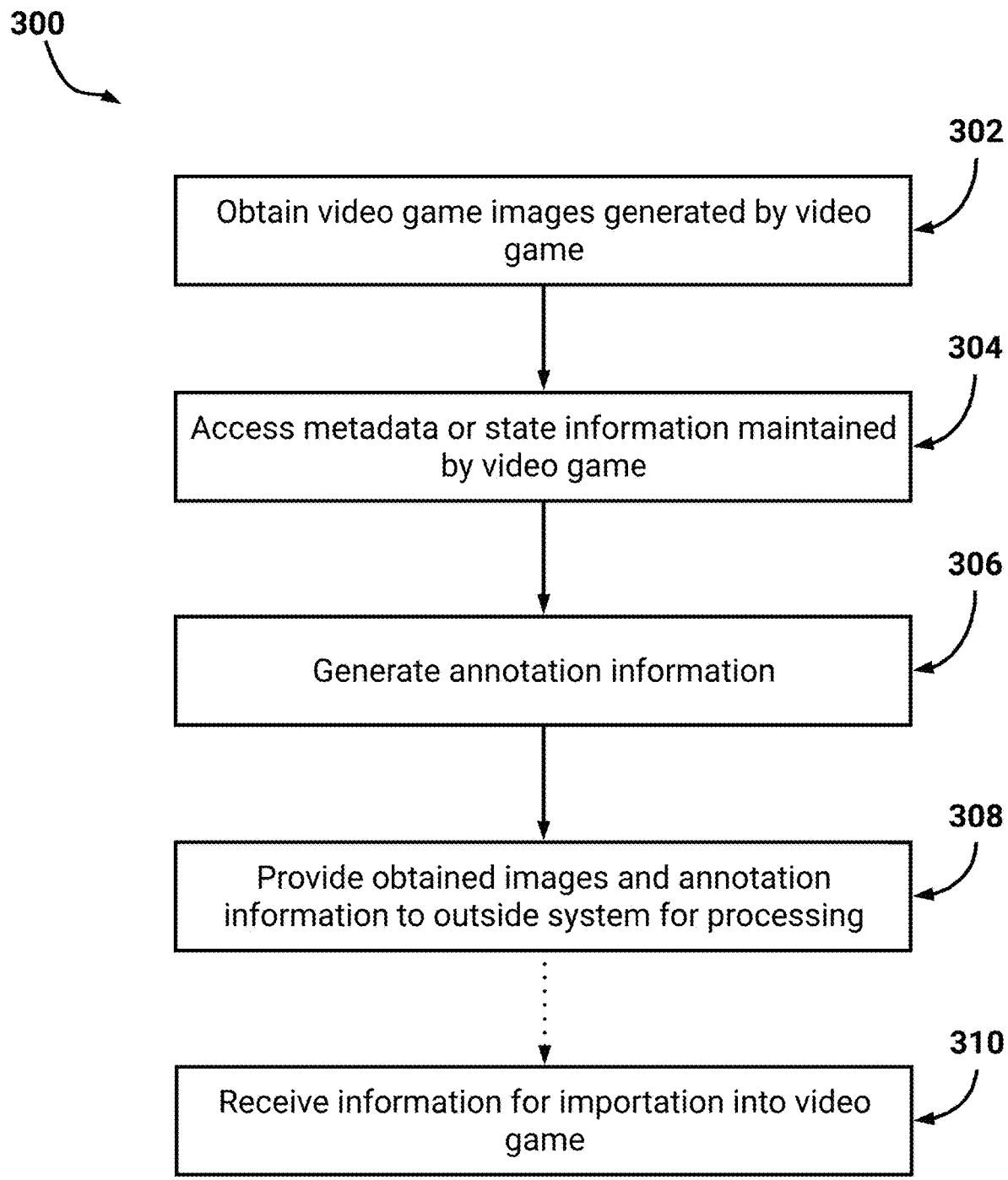
FIG. 3 illustrates a flowchart of an example process for analyzing real-world gameplay based on trained machine learning models.

FIG. 3 illustrates a flowchart of an example process 300 for generating training data. For convenience, the process 300 will be described as being performed by a system of one or more computers (e.g., a dedicated video game console, a computer system emulating a video game console, and so on as described above in FIG. 1).

At block 302 the system obtains video game images generated by a video game. As described above, the system can store images generated by a video game periodically during gameplay. For example, the video game may be operated by one or more users. As another example, the video game may be automatically operated such that video game characters within the video game are automatically controlled.

Optionally, and as described in FIG. 1, the system can adjust the obtained video games. For example, the system can reduce a resolution of the images. As another example, the system can apply blur to the video game images. As another example, the system can apply different computer vision techniques, such as an edge detection scheme as described above.

At block 304, the system accesses metadata or state information maintained by the video game. As the video game generates video game images, the video game can access its already maintained state information. As described above, the state information can include values and information associated with all variables utilized by the video game, all positions and identifications of everything presented to a user, and any associated metadata, such as camera information, and so on. This state information can be utilized to generate annotation information for the video game images.

At block 306, the system generates annotation information for an obtained video game image. The system can execute a script, or other custom software or code, to utilize the state information to generate annotation information for each obtained video game. The annotation information can be specific to features that are to be learned. As described above, annotation information may include an annotation image that adjusts the obtained video game image to indicate features that are to be learned. The system may optionally generate a plurality of annotation images. For example, a first annotation image may identify a contour of each video game character. The first annotation image may therefore assign each pixel classified as a same feature to be a same color. As an example, each player may be assigned a same color, while other features (e.g., hockey net, faceoff circle, crowd) may be assigned different colors. Additionally, the first annotation image may assign each character to be a color based on a type of the character (e.g., a goalie may be a different color than a referee, and so on). A type of character may further include whether the character is on an away or home team.

As another example, a second annotation image may be utilized to identify portions of each character. Optionally, the second annotation image may be generated for each character included in the video game image. That is, a close-up or zoomed in version of the character may be determined. Each close-up character may have its own annotation image. Using the state information, the system can identify portions of each illustrated character that correspond to a bone or joint of a skeletal model. These portions may be assigned a different color (e.g., an arm may be first a color, while a leg may be a second). Optionally, a third annotation image may identify a centroid or hip of each player. Other example annotation images may be generated, for example to identify fixed features, and so on.

At block 308, the system provides obtained video game images and annotation information to an outside system. The system can provide the generated information to the outside system to train machine learning models, for example as described above. Optionally, the outside system may request particular training data. For example, the outside system can identify that it lacks particular types of training data, such as particular animations of characters, and so on. The system can respond to this request by generated appropriate training data and providing it to the outside system.

At block 310, the system optionally receives information for importation into the video game. As will be described below in FIG. 4, the outside system may extract information from real-world gameplay. For example, the extracted information may include animation information for a real-world player. The system can receive this extracted information and utilize it in the video game. As an example, the system can cause a video game character to be animated according to the extracted information.

Figure 4:
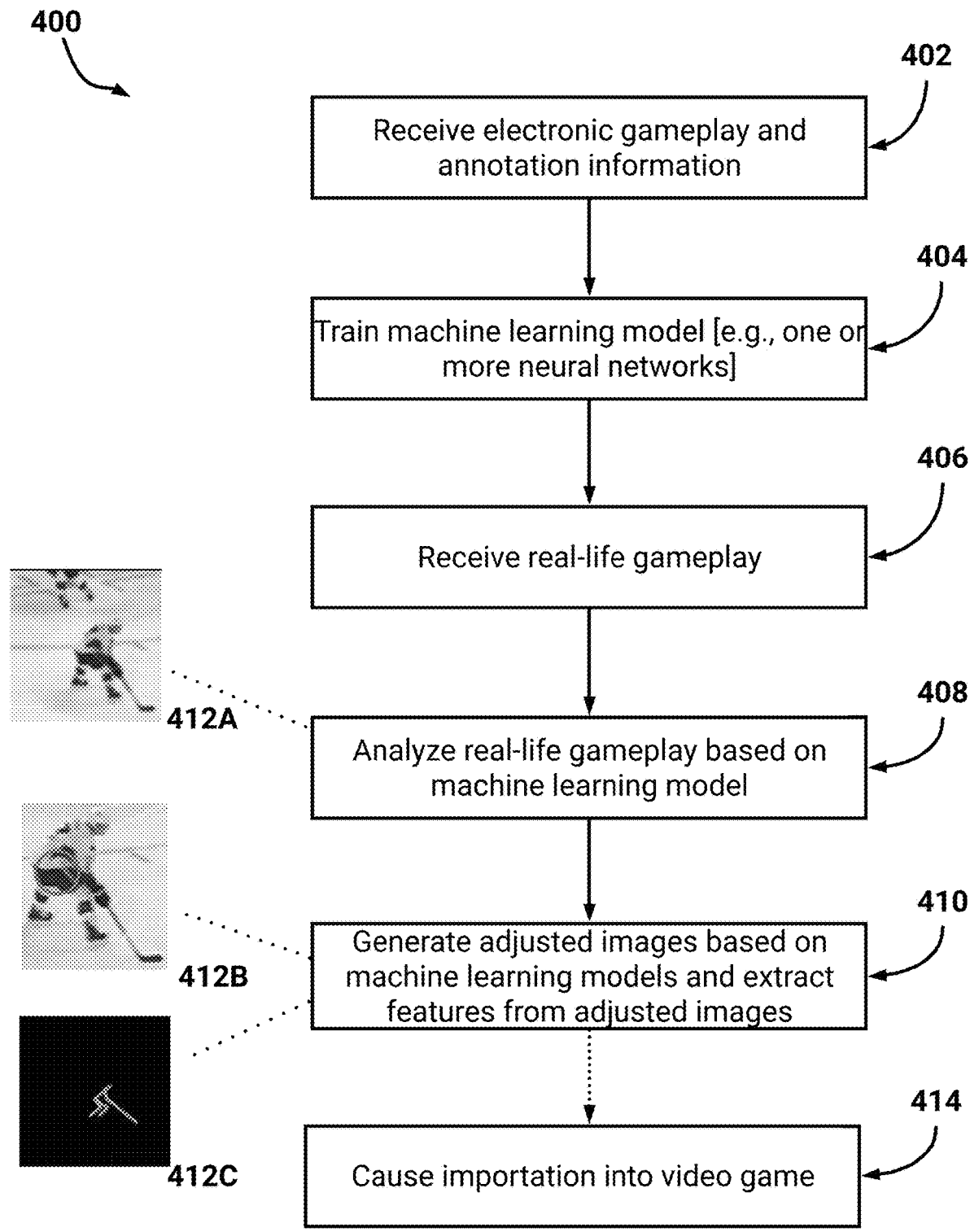
FIG. 4 illustrates a flowchart of an example process for generating training data.

FIG. 4 illustrates a flowchart of an example process 400 for analyzing real-world gameplay based on trained machine learning models. For convenience, the process 400 will be described as being performed by a system of one or more computers (e.g., the gameplay learning system 100).

At block 402, the system receives electronic gameplay and annotation information. As described in FIG. 1, the system can obtain images or video generated by a video game. These images can be provided to the system along with annotation information associated with features of the images to be learned. As an example, annotation information may include an annotation image generated from a video game image that highlights characters, fixed features, and so on. Each pixel of the annotation image may correspond to a particular feature to be learned, such as a particular classification that corresponds to each pixel.

For example, an image generated by a video game may include characters of a sports game (e.g., hockey players, referees), fixed features of an environment in which the characters are included, and so on. In the annotation image, pixels corresponding to characters may be a first color while pixels corresponding to fixed features may be different colors. As another example, pixels corresponding to characters of a same type (e.g., a goalie, a referee, a player), or on a same team, may be a same color, while pixels corresponding to characters of different types may be different colors. Similarly, pixels corresponding to same fixed features may be a same color (e.g., a faceoff circle may be a same color).

As another example, pixels corresponding different portions of a player may be colored differently in the annotation image. For example, players in a video game may be generated based on a skeletal model comprising bones connected by joints. The annotation image may therefore illustrate the differing portions of the players. As will be described in more detail below, the system learn to identify a skeletal model on real-world players.

At block 404, the system trains machine learning models. The system trains one or more machine learning models, such as neural networks, based on the received electronic gameplay (e.g., video game images) and annotation information. For example, the system can train a machine learning model to identify players included in video game images. The machine learning model may identify a portion of each video game image that includes a player. The machine learning model may also learn to highlight a contour of a player.

As another example, the system can train a machine learning model to determine a pose of each player included in a video game image. As will be described in more detail below, a machine learning model may identify a centroid of a player, or a location of a player's hips. This identified centroid or hip may form a basis of a skeletal model that forms the player. A same, or different, machine learning model may then identify one or more of arms, torso, legs, skates, head, hockey stick, and so on, based on the identified centroid or hip. These identified portions of a player can correspond to the bones and joints of a skeletal model. Therefore, the system can determine a pose for each player illustrated in a video game image.

As described in FIG. 1, the system may adjust obtained video game images prior to training machine learning models. For example, the system can apply blur to the video game images. As another example, the system can reduce a resolution or other quality characteristic of the image. Adjust the obtained video game images may increase a processing speed associated with the training. Additionally, the adjusted video game images may remove elements that distract the machine learning models from being properly trained. That is, the adjustment may remove details not relevant to the machine learning models goals of identifying players, identifying pose information, identifying specific features of an environment, and so on. Since, as described above, the system will obtain real-world gameplay images or video and analyze them using the machine learning models, the adjusted images may better correspond to the real-world gameplay images.

At block 406, the system receives videos of real-world gameplay. As described above, the system can obtain broadcasts of sports games via television broadcasts or streaming over a network.

At block 408, the system analyzes the real-world gameplay based on the trained machine learning models. As will be described below, the system can analyze images obtained from the videos (e.g., image frames) and extract features for utilization or importation in video games. For example, the system can generated images adjusted according to the machine learning models. These images can identify, highlight, and so on, specific features included in the obtained images. The system can then extract features from the adjusted images, and utilize the features to update the machine learning models, determine pose information, determine camera information, and so on as described herein. As an example described in more detail below, the system can adjust real-world gameplay image 412A based on one or more machine learning models. The adjusted image 412B can identify or highlight a particular feature (e.g., a location of a player's hips or centroid as described above). The system can then utilize this feature to extract information, such as a pose 412C of the player.

At block 410, the system provides obtained images of real-world gameplay to the trained machine learning models, which generate annotated output (e.g., adjusted versions of the obtained images). Examples of such output are described above, with respect to FIGS. 1-2F, and may include extraction of particular players, pose information for each player, identification of fixed features (e.g., faceoff circles, faceoff spots, center lines, and so on) included in the images, and so on. Additionally, three-dimensional information for the images may be determined. For example, three-dimensional positions of each player may be determined.

As another example, information describing camera movements may be determined. As described above, these camera movements may be correlated with real-world gameplay action. For example, the system can determine how camera operators track a moving puck, how particular types of action (e.g., hockey fights, faceoffs, shots on goal, and so on) are monitored. With respect to camera movements, the system may cause presentation of an interactive user interface to a user that provides detailed information regarding these camera movements. For example, a top-down view of the real-world gameplay may be presented (e.g., as illustrated in FIG. 2F). The system may then present a location of a camera that captured each image of the gameplay. Additionally, the system may present a vector extending from the camera that indicates a field of view, and thus a perspective, of the camera. In this way, the system can replay the real-world gameplay while graphically depicting how the camera was utilized. A user may interact with the user interface to see actual images or video at different points in the replayed gameplay.

As described above, pose information may be determined for each player. For example, the system can determine portions of each player and correlate these portions to a skeletal model utilized to form animations and movements of video game characters. As described above, FIG. 4 illustrates an example of an image portion 412A of a real-world player extracted from the real-world gameplay received in block 406. As described above, the system can utilize machine learning models to identify individual players in a real-world game play image. For example, the machine learning models may extract a contour of a real-world player. Optionally, the system may utilize the contour to determine a polygon surrounding the real-world player (e.g., a rectangle as illustrated in image 412A). As another example, the machine learning models may extract a polygon surrounding a real-world player (e.g., a rectangle). Thus, the image portion 412A includes a close-up (e.g., zoomed) representation of the real-world player. This close-up representation can allow the system to utilize the machine learning models to better determine a pose for the real-world player. As described above with respect to FIG. 3, the system can train the machine learning models to extract pose through training data comprising multitudes of close-up images. Thus, the machine learning models can focus on the specific player being examined without extraneous noise introduced via other players or from fixed features of the environment.

As illustrated, the system has determined a pose 412C for the real-world player included in image portion 412A. To determine the pose 412C, the system can determine portions of the real-world player that correspond to bones and/or joints of a skeletal model. As an example, the system can identify a centroid, or hip, of the real-world player. Image portion 412B represents the system having identified a centroid or hip of the player. For example, image portion 412B may be the image 412A adjusted according to machine learning models. The image portion 412B may therefore represent an output generated by the system using the machine learning models based on input image 412A. This intermediate step can be utilized to anchor the real-world player to the skeletal model illustrated in pose 412C. For example, the system can be trained to extract pose information based on an image of a player and a corresponding centroid or hip location. Thus, the system can determine an extension of each portion of the real-world player based on this identified centroid or hip of the real-world player.

The determined portions of the real-world player can then be applied to a skeletal model as illustrated in pose 412C. As an example, the system can be trained to identify portions of video game characters based on annotation information that identifies each portion differently (e.g., each portion may be a separate color, as described above). Thus, when analyzing the real-world player, the system can generate output information that similarly identifies each portion (e.g., as a different color). The system can determine one or more lines through each portion that connect to the identified centroid or hip. For example, and as illustrated in pose 412C, the system has determined a line forming the player's torso and has determined a line forming the players upper leg and lower leg (e.g., connected at the knee joint). The system has already determined a line representing the real-world player's hockey stick. In this way, the system has extracted pose information for this player.

The system can optionally monitor this real-world player as the real-world player maneuvers about the real-world environment. For example, the system can track movement of the player in images obtained of the real-world gameplay. To track movement, the system can utilize frame-to-frame tracking to monitor each player's movements between images. Without being constrained by theory, the system track players through estimating measures of motion of the player. For example, the system can determine directions of travel, and then analyze a next obtained image and locate each real-world player based on these estimated measures. Optionally, the system can determine each player's three-dimensional location within the real-world environment. The system can then identify a vector describing each player's three-dimensional motion. Thus, a time sequence of each real-world player may be obtained. The system can utilize machine learning models, such as neural networks that utilize long short-term memory for storage, to determine more complex animation information associated with the real-world player.

At block 414, the system can optionally cause a portion of the processed real-world gameplay to be imported into a video game. For example, with respect to the extracted pose information of a real-world player the system can provide the pose information to the video game. Since the pose information is correlated to a skeletal model (e.g., as illustrated in pose 412C), the video game can apply movement of the skeletal model to its own in game video game characters. With respect to the determined animation extracted from a time sequence, the video game can therefore recreate the real-world player's movements within the real-world gameplay.

In addition, the system may update the trained machine learning models based on the real-world gameplay. For example, the system can identify real-world fixed features, such as logos presented on the ice of an ice hockey rink. The system can store information identifying the logos, and may optionally cause importation into the video game of the logos. As another example, the system can update machine learning models to identify more natural and varied pose information real-world players.

As another example, and as described above with respect to FIGS. 2A-2F, the system can translate two-dimensional gameplay images into three-dimensional information. This three-dimensional information can be utilized to improve the functioning of the machine learning models, such as improvements to accuracy. For example, to translate a two-dimensional image the system can determine camera parameters associated with a real-world camera which captured the two-dimensional image. While the video game may have access to real-world locations of cameras (e.g., television cameras), the system can identify new locations of cameras based on the real-world gameplay. If, for example, broadcasts of hockey games start using unmanned aerial vehicles (UAVs) to capture hockey games, then based on the techniques described herein the system can determine their flight paths. For example, the system can identify fixed features of the ice hockey rink that are included in the drone-captured images. Utilizing these fixed features as ground control points, and geometrical information of the ice hockey rink, the system can determine a location above the fixed features from which the UAV captured an image. For example, the system can perform a photogrammetric process. In this way, the system can update the machine learning models based on this newly identified camera information. The system may then enable similar in-game camera views to be utilized in the video game.

Example Hardware Configuration of Computing System

FIG. 5 illustrates an embodiment of a hardware configuration for a computing system 500 (e.g., the gameplay learning system 100 of FIG. 1). Other variations of the computing system 500 may be substituted for the examples explicitly presented herein, such as removing or adding components to the computing system 500. The computing system 500 may include a computer, a server, a smart phone, a tablet, a personal computer, a desktop, a laptop, a smart television, and the like.

As shown, the computing system 500 includes a processing unit 502 that interacts with other components of the computing system 500 and also components external to the computing system 500. A game media reader 22 may be included that can communicate with game media. Game media reader 22 may be an optical disc reader capable of reading optical discs, such as CD-ROM or DVDs, or any other type of reader that can receive and read data from game media. In some embodiments, the game media reader 22 may be optional or omitted. For example, game content or applications may be accessed over a network via the network I/O 38 rendering the game media reader 22 and/or the game media optional.

The computing system 500 may include a separate graphics processor 24. In some cases, the graphics processor 24 may be built into the processing unit 502, such as with an APU. In some such cases, the graphics processor 24 may share Random Access Memory (RAM) with the processing unit 502. Alternatively, or in addition, the computing system 500 may include a discrete graphics processor 24 that is separate from the processing unit 502. In some such cases, the graphics processor 24 may have separate RAM from the processing unit 502. Further, in some cases, the graphics processor 24 may work in conjunction with one or more additional graphics processors and/or with an embedded or non-discrete graphics processing unit, which may be embedded into a motherboard and which is sometimes referred to as an on-board graphics chip or device.

The computing system 500 also includes various components for enabling input/output, such as an I/O 32, a user interface I/O 34, a display I/O 36, and a network I/O 38. As previously described, the input/output components may, in some cases, including touch-enabled devices. The I/O 32 interacts with storage element 303 and, through a device 42, removable storage media 44 in order to provide storage for the computing system 500. The storage element 303 can store a database that includes the failure signatures, clusters, families, and groups of families. Processing unit 502 can communicate through I/O 32 to store data, such as game state data and any shared data files. In addition to storage 503 and removable storage media 44, the computing system 500 is also shown including ROM (Read-Only Memory) 46 and RAM 48. RAM 48 may be used for data that is accessed frequently, such as when a game is being played, or for all data that is accessed by the processing unit 502 and/or the graphics processor 24.

User I/O 34 is used to send and receive commands between processing unit 502 and user devices, such as game controllers. In some embodiments, the user I/O 34 can include touchscreen inputs. As previously described, the touchscreen can be a capacitive touchscreen, a resistive touchscreen, or other type of touchscreen technology that is configured to receive user input through tactile inputs from the user. Display I/O 36 provides input/output functions that are used to display images from the game being played. Network I/O 38 is used for input/output functions for a network. Network I/O 38 may be used during execution of a game, such as when a game is being played online or being accessed online.

Display output signals may be produced by the display I/O 36 and can include signals for displaying visual content produced by the computing system 500 on a display device, such as graphics, user interfaces, video, and/or other visual content. The computing system 500 may comprise one or more integrated displays configured to receive display output signals produced by the display I/O 36, which may be output for display to a user. According to some embodiments, display output signals produced by the display I/O 36 may also be output to one or more display devices external to the computing system 500.

The computing system 500 can also include other features that may be used with a game, such as a clock 50, flash memory 52, and other components. An audio/video player 56 might also be used to play a video sequence, such as a movie. It should be understood that other components may be provided in the computing system 500 and that a person skilled in the art will appreciate other variations of the computing system 500.

Program code can be stored in ROM 46, RAM 48, or storage 503 (which might comprise hard disk, other magnetic storage, optical storage, solid state drives, and/or other non-volatile storage, or a combination or variation of these). At least part of the program code can be stored in ROM that is programmable (ROM, PROM, EPROM, EEPROM, and so forth), in storage 503, and/or on removable media such as game media 12 (which can be a CD-ROM, cartridge, memory chip or the like, or obtained over a network or other electronic channel as needed). In general, program code can be found embodied in a tangible non-transitory signal-bearing medium.

Random access memory (RAM) 48 (and possibly other storage) is usable to store variables and other game and processor data as needed. RAM is used and holds data that is generated during the play of the game and portions thereof might also be reserved for frame buffers, game state and/or other data needed or usable for interpreting user input and generating game displays. Generally, RAM 48 is volatile storage and data stored within RAM 48 may be lost when the computing system 500 is turned off or loses power.

As computing system 500 reads game media 12 and provides a game, information may be read from game media 12 and stored in a memory device, such as RAM 48. Additionally, data from storage 503, ROM 46, servers accessed via a network (not shown), or removable storage media 46 may be read and loaded into RAM 48. Although data is described as being found in RAM 48, it will be understood that data does not have to be stored in RAM 48 and may be stored in other memory accessible to processing unit 502 or distributed among several media, such as game media 12 and storage 503.

It is to be understood that not necessarily all objects or advantages may be achieved in accordance with any particular embodiment described herein. Thus, for example, those skilled in the art will recognize that certain embodiments may be configured to operate in a manner that achieves, increases, or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, and the like, may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure.

What is claimed is:

1. A computer-implemented method for using automatically generated video game-based training data to train machine learning models, the machine learning models being configured to analyze real-world gameplay, wherein the method comprises:
by a system of one or more computers,
obtaining electronic game data comprising a plurality of rendered images and associated annotation information, the annotation information identifying features included in the rendered images to be learned, and the electronic game data being generated by a video game associated with a particular sport;
training, based on the obtained electronic game data, one or more machine learning models, wherein training comprises causing the machine learning models to output annotation information based on associated input of a rendered image;
obtaining real-world gameplay data, the real-world gameplay data being a plurality of images of real-world gameplay of the particular sport; and
analyzing the obtained real-world gameplay data, wherein analyzing comprises:
adjusting the obtained images of real-world gameplay based on application of the machine learning models;
extracting features from the adjusted images;
providing, to the machine learning models, a particular image of real-world gameplay and adjusting the particular image based on application of the machine learning models;
extracting, via a first machine learning model, a contour of a real-world player included in the real-world gameplay;
identifying, via a second machine learning model, portions of the real-world player that correspond to portions of a skeletal model utilized in the video game, the second machine learning model being trained to extract skeletal models of respective video game characters; and
based on the identified portions, determining pose information associated with the real-world player.

2. The method of claim 1, wherein the machine learning models comprise one or more neural networks, and wherein each neural network is trained to identify one or more of the identified features included in the rendered images.

3. The method of claim 1, wherein annotation information comprises one or more annotation images for each obtained rendered image, and wherein an annotation information classifies each pixel of the obtained rendered image as corresponding to a feature to be learned.

4. The method of claim 1, wherein the real-world player is tracked in successive images of real-world gameplay, and wherein pose information for the real world player is determined for successive images.

5. The method of claim 4, further comprising:
generating, based on the pose information for the successive images, animation information for importation into the video game, the animation information causing the video game to adjust a skeletal model of a video game character according to the animation information; and
causing the generated animation information to be available for download via the video game.

6. The method of claim 1, wherein analyzing the obtained real-world gameplay comprises:
providing, to the machine learning models, a particular image of real world gameplay, and adjusting the particular image based on application of the machine learning models;
extracting, via a first machine learning mode model, one or more fixed features of a real world environment represented in the particular image;
determining camera parameters associated with a real-world camera that obtained the particular image; and
based on the camera parameters, determining three-dimensional locations of real-world players included in the particular image.

7. The method of claim 6, wherein movement of the real-world players included in the particular image is tracked, thereby enabling improvements to realism of artificial intelligence schemes utilized in the video game.

8. The method of claim 1, wherein obtaining electronic game data comprises:
obtaining a plurality of rendered images generated by the video game; and
accessing state information associated with the video game, and generating annotation information for each rendered image based on the state information, the annotation information describing features of the rendered image to be learned.

9. The method of claim 8, wherein generating annotation information for a particular rendered image comprises:
   accessing state information maintained by the video game, the state information informing generation of rendered images by the video game;
   identifying, for the particular rendered image, state information informing generation of a subset of the features included in the particular rendered image; and
   generating, based on the identified state information, an annotation image that classifies image pixels of the particular rendered image as corresponding to one of the features of the subset.

10. The method of claim 9, wherein the video game is in communication with a client, and wherein the client automatically generates annotation images based on state information maintained by the video game.

11. The method of claim 1, further comprising:
   identifying a deficiency with respect to electronic game data associated with one or more features;
   causing generation of electronic game data associated with the one or more features; and
   updating at least one machine learning model based on the generated electronic game data.

12. Non-transitory computer storage media storing instructions that when executed by a system of one or more computers, cause the one or more computers to perform operations comprising:
   obtaining electronic game data comprising a plurality of rendered images and associated annotation information, the annotation information identifying features included in the rendered images to be learned, and the electronic game data being generated by a video game associated with a particular sport;
   training, based on the obtained electronic game data, one or more machine learning models, wherein training comprises causing the machine learning models to output annotation information based on associated input of a rendered image;
   obtaining real-world gameplay data, the real-world gameplay data being a plurality of images of real-world gameplay of the particular sport; and
   analyzing the obtained real-world gameplay data, wherein analyzing comprises:
      adjusting the obtained images of real-world gameplay based on application of the machine learning models;
      extracting features from the adjusted images;
      providing, to the machine learning models, a particular image of real-world gameplay and adjusting the particular image based on application of the machine learning models;
      extracting, via a first machine learning model, a contour of a real-world player included in the real-world gameplay;
      identifying, via a second machine learning model, portions of the real-world player that correspond to portions of a skeletal model utilized in the video game, the second machine learning model being trained to extract skeletal models of respective video game characters; and
      based on the identified portions, determining pose information associated with the real world player.

13. The computer storage media of claim 12, wherein annotation information comprises one or more annotation images for each obtained rendered image, and wherein an annotation information classifies each pixel of the obtained rendered image as corresponding to a feature to be learned.

14. The computer storage media of claim 12, wherein the real-world player is tracked in successive images of real-world gameplay, and wherein pose information for the real world player is determined for successive images.

15. The computer storage media of claim 14, wherein the operations further comprise:
   generating, based on the pose information for the successive images, animation information for importation into the video game, the animation information causing the video game to adjust a skeletal model of a video game character according to the animation information; and
   causing the generated animation information to be available for download via the video game.

16. A system comprising one or more computers and computer storage media storing instructions that when executed by the one or more computers, cause the one or more computers to perform operations comprising:
   obtaining electronic game data comprising a plurality of rendered images and associated annotation information, the annotation information identifying features included in the rendered images to be learned, and the electronic game data being generated by a video game associated with a particular sport;
   training, based on the obtained electronic game data, one or more machine learning models, wherein training comprises causing the machine learning models to output annotation information based on associated input of a rendered image;
   obtaining real-world gameplay data, the real-world gameplay data being a plurality of images of real-world gameplay of the particular sport; and
   analyzing the obtained real-world gameplay data, wherein analyzing comprises:
      adjusting the obtained images of real-world gameplay based on application of the machine learning models;
      extracting features from the adjusted images;
      providing, to the machine learning models, a particular image of real-world gameplay and adjusting the particular image based on application of the machine learning models;
      extracting, via a first machine learning model, a contour of a real-world player included in the real-world gameplay;
      identifying, via a second machine learning model, portions of the real-world player that correspond to portions of a skeletal model utilized in the video game, the second machine learning model being trained to extract skeletal models of respective video game characters; and
      based on the identified portions, determining pose information associated with the real world player.

17. The system of claim 16, wherein the system determines pose information for images subsequent to the particular image, and wherein the operations further comprise:
   generating, based on the determined pose information, animation information for importation into the video game, the animation information causing the video game to adjust a skeletal model of a video game character according to the animation information; and
   causing the generated animation information to be available for download via the video game.

* * * * *